United States Patent [19]
Motokado et al.

[11] Patent Number: 5,526,476
[45] Date of Patent: Jun. 11, 1996

[54] METHOD AND APPARATUS FOR GENERATING CHARACTER PATTERNS EXPRESSED BY COORDINATES OF A COORDINATE SYSTEM

[75] Inventors: Shinichiro Motokado, Kawasaki; Mutsumi Ohtomo, Sapporo, both of Japan; Hellmann Antonius, Frankfurt, Germany

[73] Assignee: Fujitsu Limited, Kanagawa, Japan

[21] Appl. No.: 161,751

[22] Filed: Dec. 3, 1993

[30]     Foreign Application Priority Data

Dec. 7, 1992 [JP] Japan .................................. 4-326656
Dec. 7, 1992 [JP] Japan .................................. 4-326657

[51] Int. Cl.⁶ .................................................. G06F 15/00
[52] U.S. Cl. .................................................. 395/151
[58] Field of Search ................................ 395/142, 143, 395/150, 151; 345/141–144, 127–129, 131

[56]                References Cited

U.S. PATENT DOCUMENTS

| | | | |
|---|---|---|---|
| 4,476,464 | 10/1984 | Hobbs | 345/26 |
| 4,881,069 | 11/1989 | Kameda et al. | 345/143 |
| 5,050,103 | 9/1991 | Schiller et al. | 395/150 |
| 5,237,313 | 8/1993 | Paxton et al. | 345/143 |
| 5,241,653 | 8/1993 | Collins et al. | 395/151 |
| 5,255,357 | 10/1993 | Byron et al. | 395/151 |
| 5,274,365 | 12/1993 | Martinez et al. | 395/151 |
| 5,291,186 | 3/1994 | Martinez et al. | 395/151 |
| 5,295,240 | 3/1994 | Kajimoto | 395/151 |
| 5,304,989 | 4/1994 | Martinez et al. | 395/151 |
| 5,319,358 | 6/1994 | Martinez et al. | 395/151 |

FOREIGN PATENT DOCUMENTS

| | | |
|---|---|---|
| 62-63384 | 3/1987 | Japan . |
| 2187371 | 7/1990 | Japan . |
| 2197895 | 8/1990 | Japan . |
| 3290691 | 12/1991 | Japan . |
| 4116594 | 4/1992 | Japan . |
| 4296795 | 10/1992 | Japan . |
| 4350897 | 12/1992 | Japan . |
| 511736 | 1/1993 | Japan . |

Primary Examiner—Heather R. Herndon
Assistant Examiner—Joseph R. Burwell

[57]                ABSTRACT

A character generating method and apparatus for producing a character from outline font data, wherein the font data stored in a font memory are converted into coordinate values of a coordinate system of a designated size in a character developing circuit, the converted coordinate values are then rounded to integer coordinate values, and the integer coordinate values are adjusted by a hinting process. The integer coordinate values are developed including the adjusted coordinate values to produce a bit map image in the character developing circuit. In one mode of the hinting process, the sum of intervals between a plurality of strokes extending in the same direction are computed from coordinates after the rounding process, the sum is compared with the number of target strokes minus 1, and the integer coordinate values are changed so as to adjust a line width of a desired stroke of the target strokes when the sum is smaller than a value resulting from a subtraction. In another mode of the hinting process, scaling factors of individual intervals are computed from intervals between individual strokes before the rounding and intervals between individual strokes after the rounding, the difference between the largest scaling factor and the smallest scaling factor is computed, and the integer coordinate values of a desired stroke among the strokes are shifted so as to make the difference smaller.

31 Claims, 31 Drawing Sheets

PRIOR ART

PRIOR ART

PRIOR ART

BEFORE ROUNDING  AFTER ROUNDING

COMPUTE SCALING FACTORS OF STROKE INTERVALS BEFORE AND AFTER ROUNDING, AND SHIFT STROKE TO MAKE THE DIFFERENCE BETWEEN THE LARGEST AND SMALLEST SCALING FACTOR SMALLER

| STROKE NO. | BEFORE ROUNDING |  |  |  | AFTER ROUNDING |  |  |  | GROUP |  | THINNER FLAG |  | DELETE FLAG |  | CONTOUR COORDINATE |
|---|---|---|---|---|---|---|---|---|---|---|---|---|---|---|---|
|  | Xl | Xr | Yb | Yu | Xl | Xr | Yb | Yu | X | Y | X | Y | X | Y |  |
| 1 |  |  | 13.9 | 15.8 |  |  | 13 | 15 |  |  |  |  |  |  |  |
| 2 | 1.7 | 3.5 |  |  | 2 | 4 |  |  | 1 |  |  |  |  |  |  |
| 3 |  |  | 10.2 | 12.0 |  |  | 10 | 12 |  | 1 |  |  |  |  |  |
| 4 | 12.4 | 14.2 |  |  | 12 | 14 |  |  | 1 |  |  |  |  |  |  |
| 5 |  |  | 6.9 | 8.7 |  |  | 7 | 9 |  | 1 |  | SET |  |  |  |
| 6 |  |  | 4.8 | 6.6 |  |  | 5 | 7 |  | 1 |  |  |  | SET |  |
| 7 |  |  | 1.7 | 4.1 |  |  | 2 | 4 |  | 1 |  |  |  |  |  |
| 8 | 6.3 | 9.2 |  |  | 7 | 9 |  |  | 1 |  |  |  |  |  |  |

FIG. 19

| STROKE NO. | BEFORE ROUNDING | | | | AFTER ROUNDING | | | | GROUP | | THINNER FLAG | | DELETE FLAG | | CONTOUR COORDINATE |
|---|---|---|---|---|---|---|---|---|---|---|---|---|---|---|---|
| | Xl | Xr | Yb | Yu | Xl | Xr | Yb | Yu | X | Y | X | Y | X | Y | |
| 1 | | | | | | | | | | | | | | | |
| 2 | | | 11.5 | 12.1 | | 11 | 12 | | | | | | | | |
| 3 | | | | | | | | | | | | | | | |
| 4 | 1.8 | 3.2 | | | 2 | 3 | | | | | | | | | |
| 5 | | | 9.5 | 10.1 | | | 9 | 10 | | 1 | | | | | |
| 6 | 8.8 | 10.2 | | | 9 | 10 | | | | | | | | | |
| 7 | | | 8.3 | 8.9 | | | 8 | 9 | | 1 | | SET | | | |
| 8 | | | 7.1 | 7.7 | | | 7 | 8 | | 1 | | | | | |
| 9 | 0.7 | 2.1 | | | 1 | 2 | | | 1 | | | | | | |
| 10 | | | 5.9 | 6.5 | | | 6 | 7 | | 2 | | | | | |
| 11 | 11.4 | 12.8 | | | 10 | 11 | | | 1 | | | | | | |
| 12 | | | 4.8 | 5.4 | | | 4 | 5 | | 2 | | SET | | SET | |
| 13 | | | 2.5 | 3.1 | | | 2 | 3 | | 2 | | | | | |
| 14 | 5.6 | 7.0 | | | 5 | 6 | | | 1 | | | | | | |

FIG. 24

| STROKE NO. | BEFORE ROUNDING | | | | AFTER ROUNDING | | | | GROUP | | THINNER FLAG | | DELETE FLAG | | CONTOUR COORDINATE |
|---|---|---|---|---|---|---|---|---|---|---|---|---|---|---|---|
| | X1 | Xr | Yb | Yu | X1 | Xr | Yb | Yu | X | Y | X | Y | X | Y | |
| 1 | 1.3 | 2.7 | | | 1 | 3 | | | | | | | | | |
| 2 | | | 11.5 | 12.7 | | | 12 | 13 | | 1 | | | | | |
| 3 | 7.7 | 9.3 | | | 8 | 10 | | | | | | | | | |
| 4 | | | 8.3 | 9.5 | | | 8 | 9 | | | | | | | |
| 5 | | | 4.5 | 5.7 | | | 5 | 6 | | 1 | | SET | | SET | |
| 6 | | | 0.3 | 1.5 | | | 0 | 1 | | 1 | | SET | | | |

FIG. 32

METHOD AND APPARATUS FOR GENERATING CHARACTER PATTERNS EXPRESSED BY COORDINATES OF A COORDINATE SYSTEM

BACKGROUND OF THE INVENTION

1. Field of the Invention

The present invention relates to a character generating method and apparatus for developing an outline character, expressed by a logical coordinate system, on physical coordinates expressed by integer values.

2. Description of the Related Art

A printer, a display device or the like requires that character patterns be generated to print or display characters. In the generation of character patterns, recently, characters of various character sizes are demanded even for the same character. Therefore, the memory capacity increases if characters of various character sizes are given for the same character by bit patterns. Particularly, characters having many types of characters like Kanji characters require a large memory capacity.

As a solution to this problem, a method of generating characters by outline fonts is known. According to this method, data of character patterns whose contour lines are expressed in real numbers and also by a logical coordinate system, is provided, and this data is converted to a designated character size coordinate system to develop characters to a bit map image expressed by integer values.

Conventionally, in developing logical coordinate data expressed by real numbers, such as a figure or an outline font, to a bit map image expressed by integer values, a fractional portion of character data is rounded so that the data will be expressed in the units of pixels of a printer or a display. In order to express coordinate data by closest pixels, typical rounding is to count fractions of 5 and over as a whole number.

For example, individual points (contour points) which constitute a Kanji character "Kuruma" expressed in an outline form as shown in FIG. 1, are stored by integer logical coordinates like 1000×1000.

Character outline data on the logical coordinates are converted to the necessary character size to have coordinate values including decimal points. If all the points are rounded to express the coordinate values by physical coordinates, all the points will be rounded to the nearest whole numbers. For conversion to a character size of 24×24 dots, for example, a Kanji character "Kuruma" shown in FIG. 1 becomes as shown in FIG. 2A through the coordinate conversion and rounding. In this example, since the original character is designed thick, the generated character bit map image has a width of two pixels.

If the same character is converted to have a bit map image of 16 dots in both vertical and horizontal directions (16×16 dots), it becomes as shown in FIG. 2B and two adjacent center horizontal strokes contact with each other.

Likewise, when a Kanji character "Kame" expressed in an outline form by logical coordinates of 1000×1000, as shown in FIG. 3, is converted to a character size of 16×16 dots, it becomes as shown in FIG. 4A.

The Kanji character "Kame" contains three horizontal strokes included in each of two elements "Hi" constituting this Kanji character, one horizontal stroke in the head portion and one horizontal stroke in the bottom portion. Therefore, this Kanji character contains a total of eight horizontal strokes. To express eight horizontal strokes, 16 dots are needed, including the white portions between the horizontal strokes. A bit map image of 16×16 dots is therefore the smallest size that can be expressed correctly.

If the Kanji character is reduced to physical coordinates of 12×12 dots, some horizontal strokes will contact with each other as shown in FIG. 4B because there are no dots to express white space between the horizontal strokes.

When a character designed in thick lines, like a Gothic character, is reduced, some horizontal strokes will contact with each other, as shown in FIG. 2B. The contacted portion appears smeared out in black, and the character will not be recognized accurately, thus impairing the readability.

Likewise, when a character which has a complex design even with thin lines, is reduced, some horizontal strokes will contact with each other, as shown in FIG. 4B. The contacted portion also appears smeared out in black, so that the character will not be recognized accurately, thus impairing the readability.

Further, individual points (contour points) which constitute a Kanji character "Me" expressed in an outline form as shown in FIG. 5, are stored by integer logical coordinates like 1000×1000. For instance, to convert this Kanji character to a character size of 12×14 dots, the left vertical stroke of the Kanji character "Me" is expressed by X coordinates e=1.2 to e'=2.7 through coordination conversion as shown in FIG. 6A. Through a rounding process, this vertical stroke becomes a bit map image having a width of two pixels from 1 to 3 in X coordinates as shown in FIG. 6B. The right vertical stroke of the Kanji character "Me" is expressed by X coordinates f=7.7 to f'=9.2. Through a rounding process, this vertical stroke becomes a bit map image having a width of one pixel from 8 to 9 in X coordinates as shown in FIG. 6B.

In this manner, even the vertical strokes which originally have the same width will have different widths, two pixels on the left-hand side and one pixel on the right-hand side, on physical coordinates through a rounding process.

Likewise, through coordinate conversion, the four horizontal strokes of the Kanji character "Me" are expressed by Y coordinates of d=11.5 to d'=12.7, c=8.3 to c'=9.5, b=4.5 to b'=5.7 and a=0.3 to a'=1.5 in the top-to-down order, respectively, as shown in FIG. 6A. Through rounding, as shown in FIG. 6B, those strokes are respectively expressed by d=12 to d'=13, c=8 to c'=10, b=5 to b'=6 and a=0 to a'=2. That is, the horizontal strokes respectively have line widths of one pixel, two pixels, one pixel, and two pixels.

Although those horizontal strokes have the line width of "1.2," two of their line widths will become one pixel and the other line widths two pixels through a rounding process.

For a bit map font developed from an outline font, since this width difference will change the impression of a character, it should be made as small as possible.

As a solution to this problem, a line-width retaining rounding process as shown in FIGS. 7A and 7B has been proposed. This method is to round one of the top and bottom contour lines of a horizontal stroke or one of the right and left contour lines of a vertical stroke by priority, and is to round the other contour line while keeping the line width.

Of the Kanji character "Me" after coordinate conversion shown in FIG. 7A, a, b, c, d, e and f are the contour lines that are to be rounded by priority, and a', b', c', d', e' and f' are the contour lines that are to be rounded while keeping their line widths intact. First, the contour line of the bottom horizontal stroke expressed by the Y coordinate a is rounded, and "0.3" becomes "0" through the rounding process.

Then, the contour line of the bottom horizontal stroke expressed by the Y coordinate a' is rounded. As the line width is kept at this time, the difference of "−0.3" originated from the rounding of a from 0.3 to 0 is added to the Y coordinate of a', and a'=1.5−0.3=1.2. Thus, the line width becomes one pixel through the rounding process.

Likewise, the Y coordinate of the contour line d for the topmost horizontal stroke is "11.5" and becomes "12" through rounding. The Y coordinate of the contour line d' becomes 12.7+0.5 (difference)=13.2 in accordance with the line-width retaining process. Thus, the Y coordinate becomes "13" through the rounding process, and the line width becomes one pixel. The Y coordinate of the contour line c for the second horizontal stroke from the topmost one is "8.3" and becomes "8" through rounding. The Y coordinate of the contour line c' becomes 9.5−0.3 (difference)=9.2 in accordance with the line-width retaining process. Thus, the Y coordinate becomes "9" through the rounding process, and the line width becomes one pixel. The Y coordinate of the contour line b for the third horizontal stroke is "4.5" and becomes "5" through rounding. The Y coordinate of the contour line b' becomes 5.7−0.5 (difference)=6.2 in accordance with the line-width retaining process. Thus, the Y coordinate becomes "6" through the rounding process, and the line width becomes one pixel. In this manner, the line widths of the horizontal strokes all become one pixel, closest to the original width of 1.2. Similarly, the line widths of the vertical strokes become two pixels as shown in FIG. 7B.

Although the line widths of the horizontal strokes becomes the same in this method, the intervals between those horizontal strokes become three pixels, two pixels and four pixels from the top, as shown in FIG. 7B. Those intervals will be compared with the original intervals. As shown in FIG. 7A, the stroke intervals in the top-to-bottom order before the rounding are d−c'=11.5−9.5=2.0, c−b'=8.3−5.7=2.6, and b−a'=4.5−1.5=3.0. That is, while the original intervals of the horizontal strokes become wider in the top-to-bottom order, the intervals after rounding become wider in the order of the middle stroke, the top stroke and the bottom stroke, and the order has changed.

More specifically, while the interval between the positions c' and d is originally 2.0, it is reproduced to be three pixels. While the interval between the positions b' and c is originally 2.6, it has become two pixels. For a character having many horizontal strokes and vertical strokes, it is important to precisely reproduce the line widths and stroke intervals in particular to provide a character expressed by logical coordinates in order to improve the character quality. However, even through the line widths are improved, the intervals are not adjusted properly.

SUMMARY OF THE INVENTION

It is therefore an object of the present invention to provide a character generating method and apparatus for generating a character of a small size with improved readability from outline data.

It is another object of this invention to provide a character generating method and apparatus designed to prevent the bit map image of a character, which is generated by physical coordinates, from being partly smeared out in black due to the contact of adjacent strokes with each other in the generation of a character having a plurality of parallel vertical strokes or horizontal strokes.

It is a further object of this invention to provide a character generating method and apparatus for generating a character with adjusted intervals between strokes.

It is still a further object of this invention to provide a character generating method and apparatus for producing a bit map image having stroke intervals given along the original design of a character having a plurality of parallel vertical strokes or horizontal strokes in the generation of the character.

According to one aspect of this invention, there is provided a character generating method of producing a bit map image from outline font data in which contour lines of a character are expressed by coordinates, comprising the steps of converting the outline font data to coordinate values of a coordinate system of a designated size; rounding the converted coordinate values to integer coordinate values; computing a sum of intervals between a plurality of strokes in the same direction by coordinates after the rounding process; comparing the sum with the number of target strokes minus 1; changing the integer coordinate values so as to adjust a line width of a desired stroke of the target strokes when the sum is smaller than a value resulting from the subtraction; and developing the integer coordinate values including the adjusted coordinate values to produce the bit map image.

According to another aspect of this invention, there is provided a character generating apparatus of producing a bit map image from outline font data in which contour lines of a character are expressed by coordinates, comprising a font memory for storing the outline font data of each character; and a character developing circuit for converting outline font data of a designated character, read from the font memory, to coordinate values of a coordinate system of a designated size, rounding the coordinate values to integer coordinate values, detecting if there is any contact between strokes of the character from the coordinate values after the rounding process, and changing the integer coordinate values if there is such contact to produce the bit map image.

According to those aspects, it is determined from the integer coordinate values after rounding if strokes after rounding are in contact with each other. To do so, first, the sum of the intervals of the strokes after rounding is computed. Because the minimum condition that no strokes contact with each other is that any interval is equal to the total number of strokes minus 1, this sum is to be compared with the resultant value of the subtraction. When the sum is smaller than the subtracted value, it is determined that some strokes are in contact with each other, so that the line widths of some strokes are adjusted. As one way of the adjustment of a line width, the line width is made thin to prevent the strokes from contacting with each other, thereby preventing part of the character from being smeared out in black. As another adjustment, some stroke is deleted to prevent any contact between the strokes, thereby preventing part of the character from being smeared out in black.

According to a further aspect of this invention, there is provided a character generating method of producing a bit map image from outline font data in which contour lines of a character are expressed by coordinates, comprising the steps of converting the outline font data to coordinate values of a coordinate system of a designated size; rounding the converted coordinate values to integer coordinate values; computing scaling factors of individual intervals from intervals between individual strokes before the rounding and intervals between individual strokes after the rounding; computing a difference between a largest scaling factor and a smallest scaling factor among the scaling factors; shifting the integer coordinate values of a desired stroke among the strokes in a direction to make the difference smaller; and developing the integer coordinate values including the shifted coordinate values to produce the bit map image.

According to a still further aspect of this invention, there is provided a character generating apparatus of producing a bit map image from outline font data in which contour lines of a character are expressed by coordinates, comprising a font memory for storing the outline font data of each character; and a character developing circuit for converting outline font data of a designated character, read from the font memory, to coordinate values of a coordinate system of a designated size, rounding the coordinate values to integer coordinate values, and changing the integer coordinate values in such a way as to make a difference between largest and smallest scaling factors of stroke intervals before and after the rounding to thereby produce the bit map image.

According to those two aspects, if the scaling factors of the stroke intervals after the rounding process are similar to those of the stroke intervals of the original character, the stroke intervals after the rounding process can have reproduced the design of the original character. In this respect, the scaling factors of the individual intervals between strokes before rounding and those after rounding are computed, and the coordinates of the strokes between a plurality of stroke intervals are shifted so as to make the difference between the largest and smallest scaling factors among the computed scaling factors smaller.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention.

FIG. 19 is an explanatory diagram for a character developing table in the embodiment shown in FIG. 15;

FIG. 24 is an explanatory diagram for a character developing table in the embodiment shown in FIG. 20;

FIG. 32 is an explanatory diagram for a character developing table in the embodiment shown in FIG. 28;

DETAILED DESCRIPTION OF THE PREFERRED EMBODIMENTS

Figure 8:
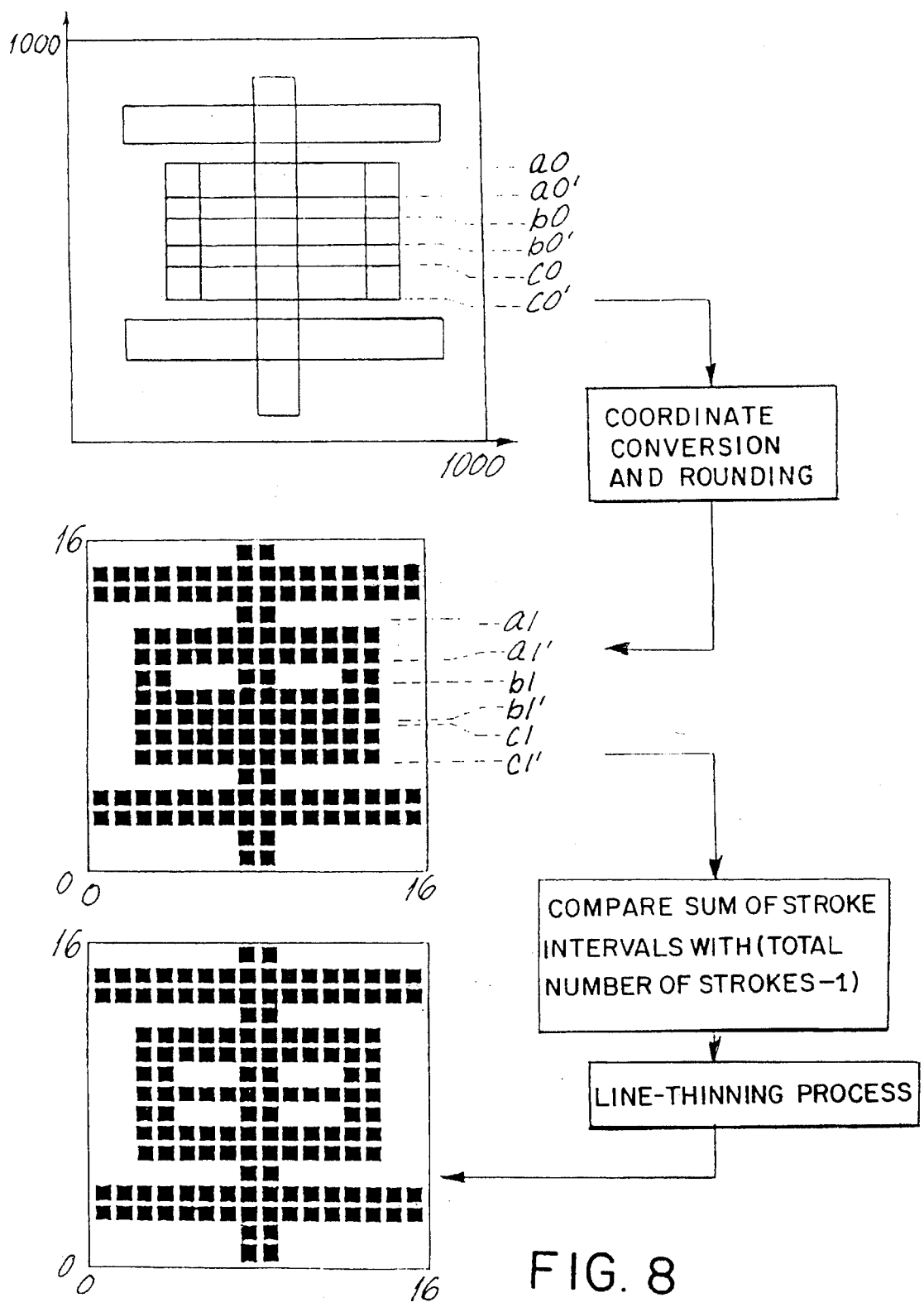
FIG. 8 is a diagram (part 1) for explaining the principle of this invention.

FIG. 8 is a diagram (part 1) illustrating the principle of this invention. As shown in FIG. 8, outline coordinates a0 to c0' stored in a coordinate system of 1000×1000 are subjected to coordinate conversion to a designated size. Then, the resultant values are rounded to obtain integer coordinate values. For instance, when a Kanji character "Kuruma" is converted to a size of 16×16 dots, the lower end coordinate b1' of the middle stroke and the upper end coordinate c1 of the lower stroke become the same coordinate value, so that those strokes contact with each other. To detect this contact, the sum of the intervals of the target stroke is calculated, and is compared with the total number of the target strokes minus 1. When the sum is smaller than the total number of the target strokes minus 1, a line-thinning process is performed. That is, the middle stroke of the target strokes, excluding the outer strokes, is made thinner, thereby preventing the strokes from contacting with each other.

Figure 9:
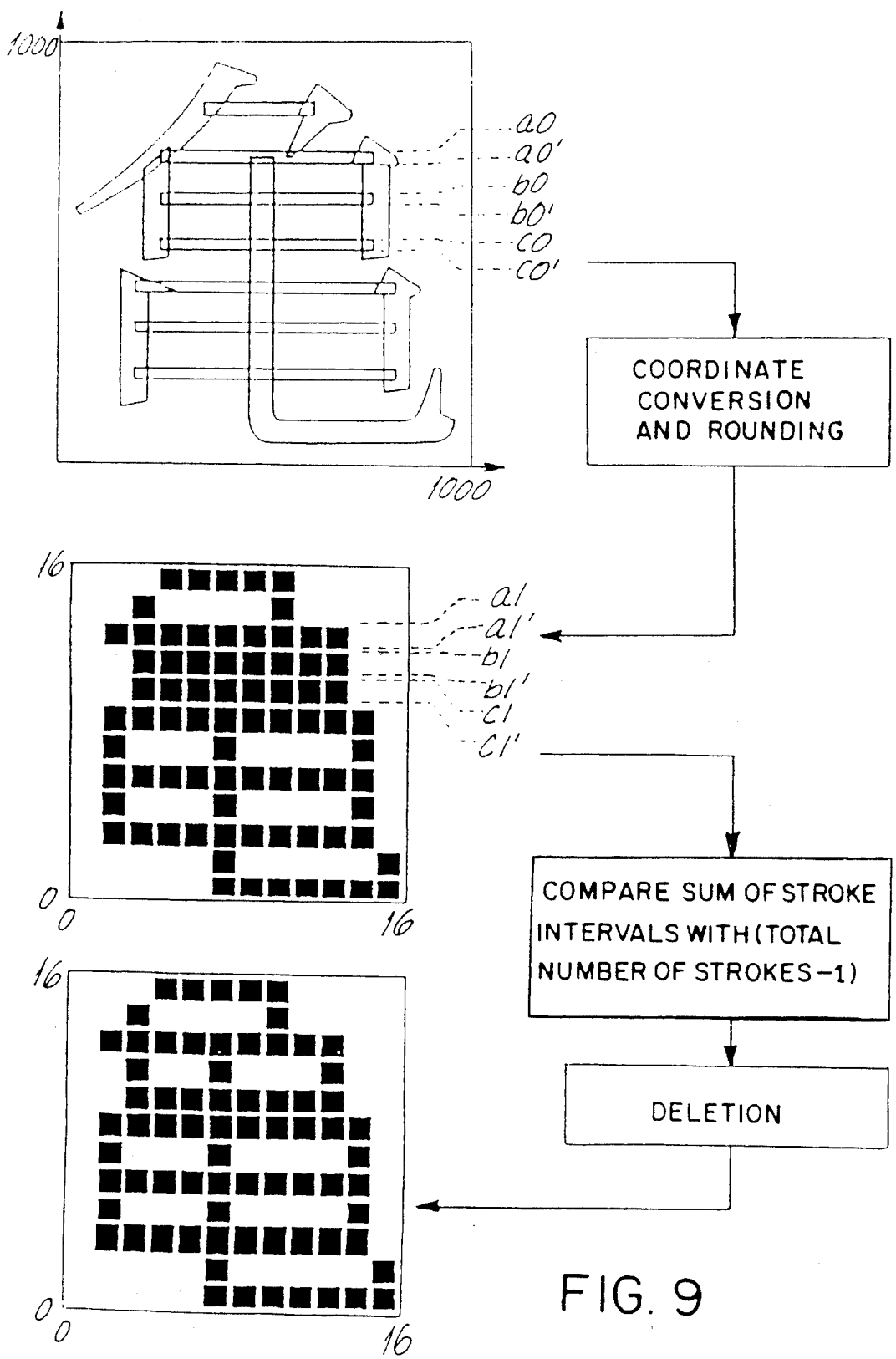
FIG. 9 is a diagram (part 2) for explaining the principle of this invention.

FIG. 9 is a diagram (part 2) illustrating the principle of this invention. As shown in FIG. 9, outline coordinates a0 to c0' stored in a coordinate system of 1000×1000 are subjected to coordinate conversion to a designated size. Then, the resultant values are rounded to obtain integer coordinate values. For instance, when a Kanji character "Kame" is converted to a size of 12×12 dots, the lower end coordinate a1' of the upper stroke and the upper end coordinate b1 of the middle stroke become the same coordinate value, and the lower end coordinate b1' of the middle stroke and the upper end coordinate c1 of the lower stroke become the same coordinate value. Therefore, those strokes contact with one another. To detect this contact, the sum of the intervals of the target stroke is calculated, and is compared with the total number of the target strokes minus 1. When the sum is smaller than the total number of the target strokes minus 1, it is determined that the strokes are in contact with one another. In this case, when the stroke line width is one pixel, if the stroke line width is made smaller, that stroke will be deleted. Therefore, an erasing process will be performed. That is, the middle stroke of the target strokes, excluding the outer strokes, is deleted, thereby preventing the contact between the strokes.

Figure 10:
FIG. 10 is a diagram (part 3) for explaining the principle of this invention.
Figure 10:
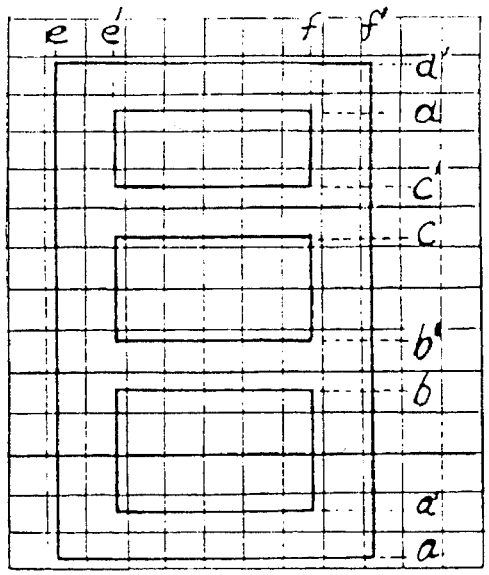
Figure 10:
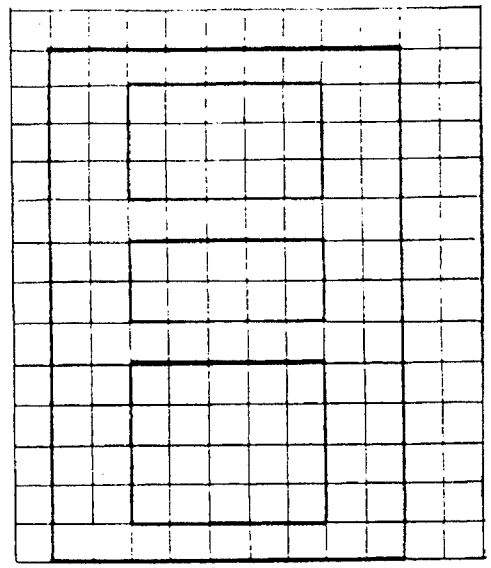
Figure 10:
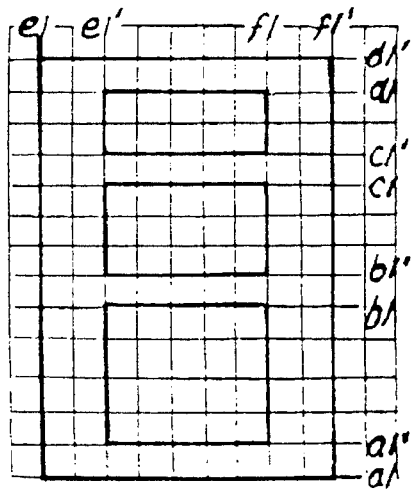

FIG. 10 is a diagram (part 3) illustrating the principle of this invention. As shown in FIG. 10, outline coordinates a to e stored in an outline coordinate system are subjected to coordinate conversion to a designated size. Then, the resultant values are rounded to obtain integer coordinate values. For instance, when a Kanji character "Me" is converted to a size of 14×12 dots, the stroke intervals change. To minimize the change in stroke intervals, the stroke intervals before rounding and those after rounding are computed. Then, scaling factors of the stroke intervals before rounding and those of the stroke intervals after rounding are calculated. Further, the largest and smallest scaling factors among the calculated scaling factors are obtained. Then, the strokes are shifted to minimize the difference between the largest scaling factor and the smallest scaling factor. Accordingly, the stroke intervals can be adjusted in accordance with the original design.

Figure 11:
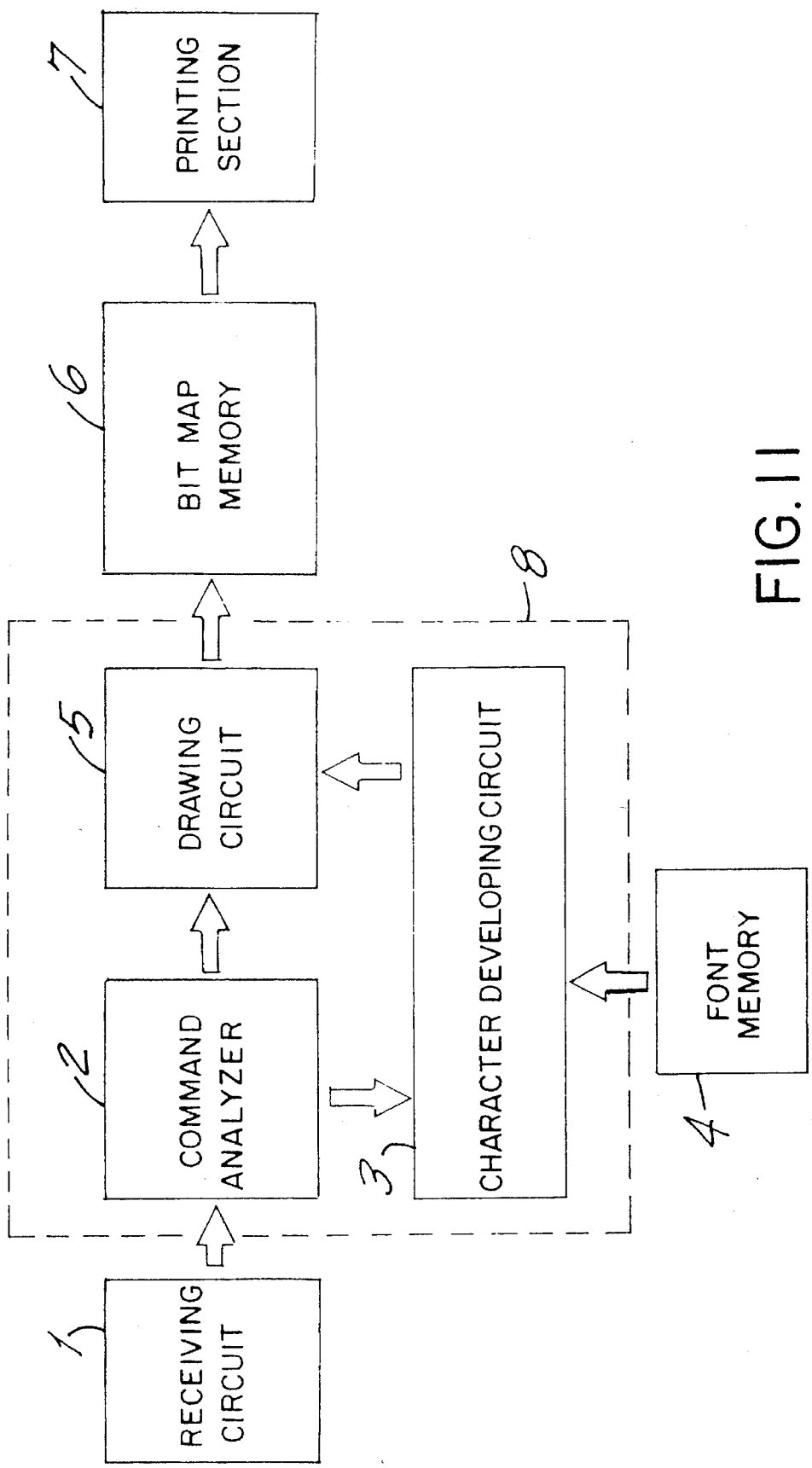
FIG. 11 is a block diagram of one embodiment of this invention.
Figure 12:
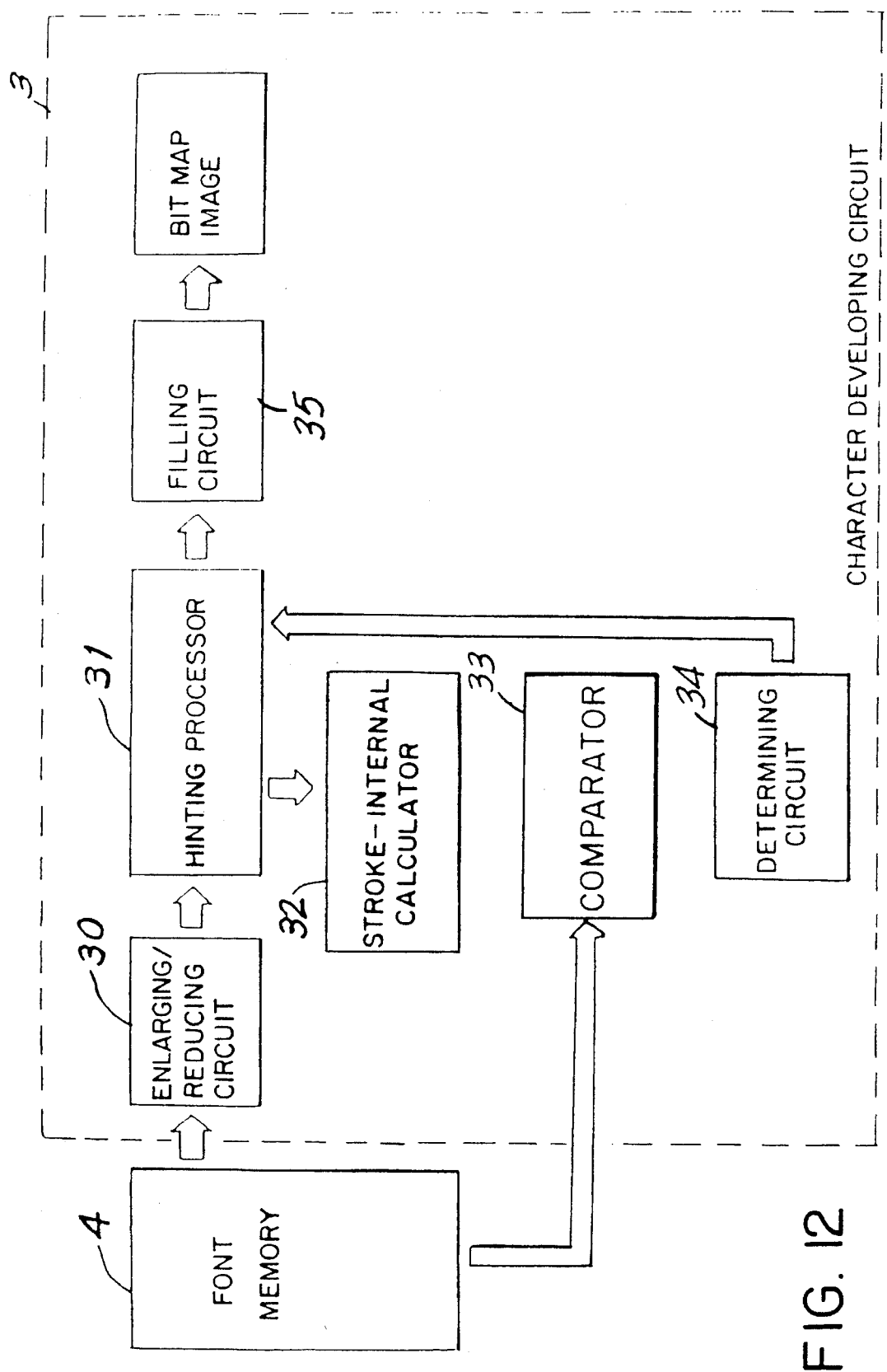
FIG. 12 is a block diagram of a character developing section according to the first embodiment of this invention.
Figure 13:
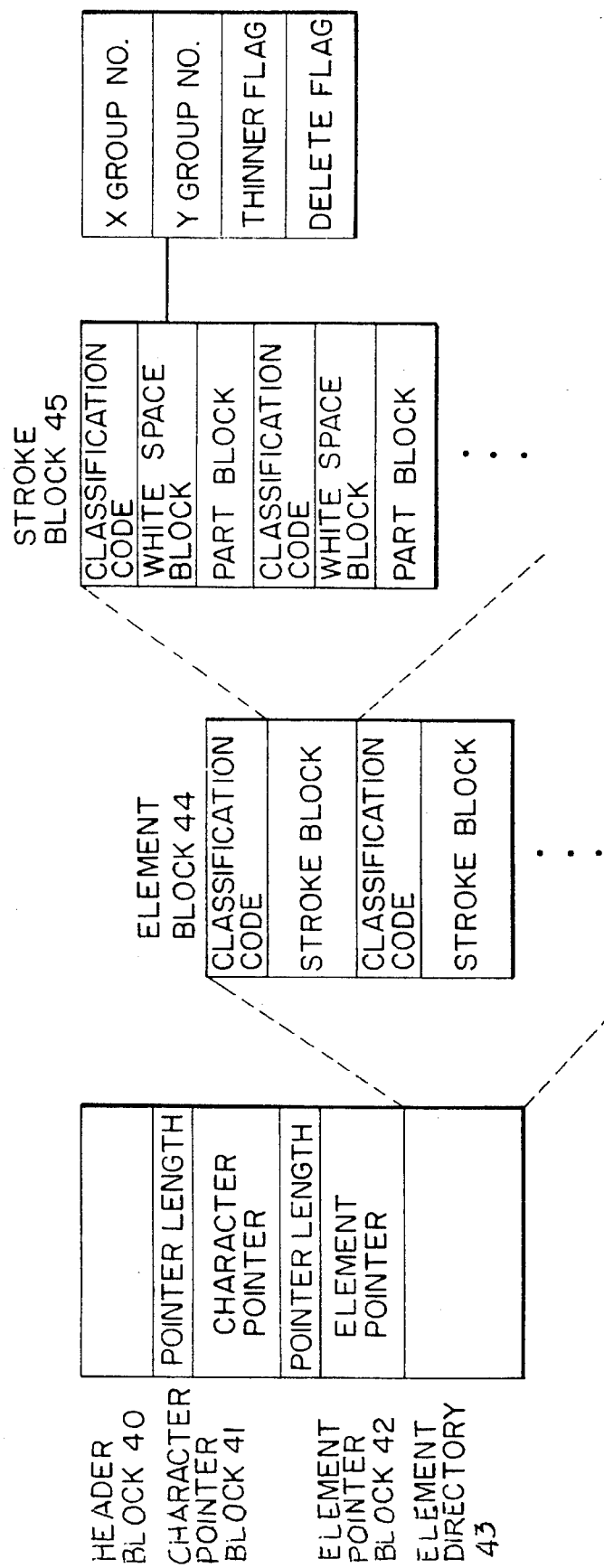
FIG. 13 is a diagram (part 1) showing the structure of a font memory in FIG. 11.
Figure 14:
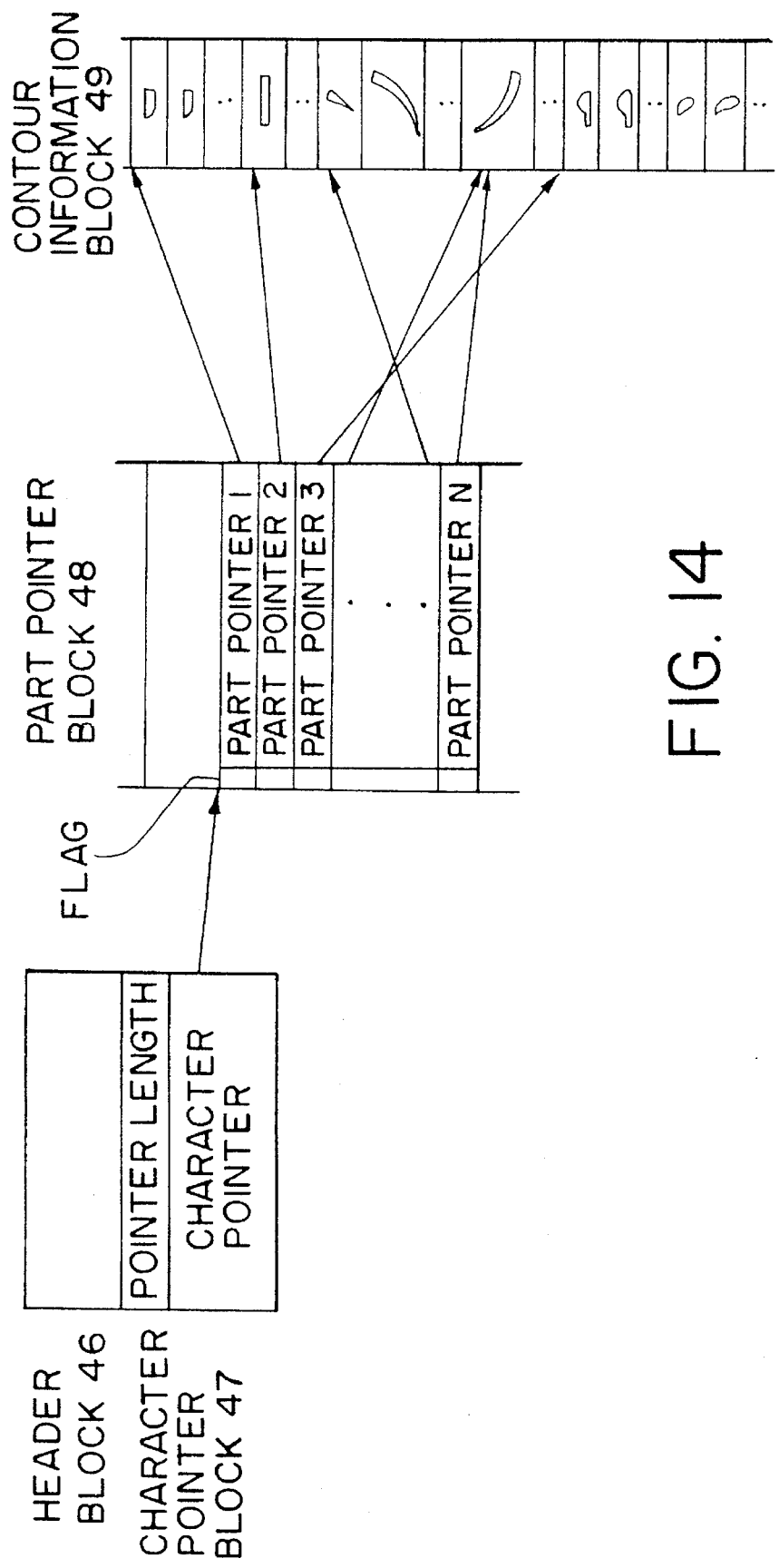
FIG. 14 is a diagram (part 2) showing the structure of the font memory in FIG. 11.

FIG. 11 is a block diagram of one embodiment of this invention, FIG. 12 is a block diagram of a character developing section according to the first embodiment of this invention, and FIGS. 13 and 14 are diagrams (part 1 and part 2) showing the structure of a font memory of one embodiment of this invention.

As shown in FIG. 11, a receiving circuit 1 receives a print command and print data from a higher-level device (computer or the like). The receiving circuit 1 is constituted of a microcomputer. A command analyzer 2 analyzes the meaning of the print command, etc. received at the receiving circuit 1, and separates the received data into a character and a figure. A character developing circuit 3 receives a character code, a character size and a character direction from the command analyzer 2, reads character data from a font memory 4, and develops the associated character into a bit map image. This character developing circuit 3 will be described in detail later with reference to FIG. 12. The font memory 4 stores character data in an outline form. The font memory 4 will be described in detail later with reference to FIGS. 13 and 14.

A drawing circuit 5 develops a figure or an image into a bit map image, overlaps the character and figure, which have been developed into bit map images, one on the other, and writes the resultant image in a bit map memory 6. A printing mechanism 7 prints data from the bit map memory 6 on a sheet of paper. The command analyzer 2, character developing circuit 3 and drawing circuit 5 are constituted of a single microprocessor 8.

The operation of this microprocessor 8 will now be described. The meanings of the print command and print data received at the receiving circuit 1 are analyzed by the command analyzer 2, and are separated into a character and a figure. A figure and an image are developed to bit map images by the drawing circuit 5. A character is developed into a bit map image of the designated character size by the character developing circuit 3, using outline font data stored in the font memory 4.

The drawing circuit 5 overlaps the character and figure, which have been developed to bit map images, one on the other, and writes the resultant image in the bit map memory 6. The data in the bit map memory 6 will be printed on a sheet of paper by the printing mechanism 7.

FIG. 12 presents a detailed illustration of the character developing circuit B. An enlarging/reducing circuit 30 performs an enlarging/reducing operation so that character outline data corresponding to the character code from the font memory 4 becomes the designated character size. A hinting processor 31 has a character developing table (which will be discussed later with reference to FIGS. 19 and 24) that holds data before a hinting process and data after the hinting process for each stroke. The hinting processor 31 performs a rounding (hinting) process or the like to adjust the width of a stroke or delete it in order to improve the character quality of the bit map.

A stroke-interval calculator 32 computes stroke intervals between horizontal strokes or vertical strokes after a hinting (rounding) process and the sum of the intervals. A comparator 33 compares the computed sum of the stroke intervals with the total number of the strokes to be checked minus 1. When the sum is smaller than the resultant value of the subtraction, a determining circuit 34 instructs the hinting processor 31 to make a stroke in question thinner or delete it. A filling circuit 35 fills inside the contour lines in accordance with the contour data in the hinting processor 31 to complete a bit map image.

Those block circuits 30 to 35 of the character developing circuit 3 are functional blocks of the software of the processor 8.

The operations of those blocks will be described below. The character developing circuit 3 searches the font memory 4 for outline data of a designated character. Then, the outline data is enlarged or reduced to become the designated size by the enlarging/reducing(scaling) circuit 30. The hinting processor 31 stores the coordinate data after the enlargement/ reduction in the character developing table, and rounds this data to obtain coordinate data after a hinting process. The resultant coordinate data is stored in the character developing table.

This coordinate data is given to the stroke-interval calculator 32. The stroke-interval calculator 32 computes intervals between horizontal strokes or vertical strokes after the hinting process and also computes the sum of the stroke intervals.

The comparator 33 compares the computed sum of the stroke intervals with the total number of the strokes to be checked minus 1, and gives the comparison result to the determining circuit 34. When determining from the comparison result that the sum is smaller than the resultant value of the subtraction and there is no blank space between strokes, the determining circuit 34 instructs the hinting processor 31 to make one of the strokes, excluding outer two strokes, thinner or delete it.

When the comparison result indicates that the sum is equal to or greater than the resultant value of the subtraction, the hinting processor 31 will not perform a special process and gives data after the hinting process to the filling circuit 35. When the comparison result indicates that the sum is smaller than the resultant value of the subtraction, the hinting processor 31 alters the rounded data to prepare data after a hinting process in such a way as to make one of the strokes, excluding outer two strokes, thinner or delete it, and gives that data to the filling circuit 35. Finally, the filling circuit 35 fills inside the contour lines in accordance with the received data to complete a bit map image.

The structure of the font memory 4 will be described referring to FIGS. 13 and 14. The description will be given with reference to the case where a character is broken down in a hierarchical structure to elements corresponding to the left-hand radical and the right-hand radical, constituting that character, strokes corresponding to the brush movements, and parts corresponding to the stroking start portion and stroking end portion. Further, in this description it will be explained that in order to reduce the amount of data, the font memory 4 comprises a structure data memory 4a in FIG. 13 for storing the hierarchical structures and characteristic data of characters, and a contour data memory 4b for storing contour data of each character broken down to strokes or parts.

As shown in FIG. 13, the structure data memory 4a includes a header block 40 where the type of a character set (Mincho, Gothic, etc.) and common data, such as the prepared date, are stored, a character pointer block 41 for searching for target data based on the character code, an element pointer block 42 which indicates broken-down elements, such as the left-hand radical and right-hand radical, and an element directory block 43 which describes what structure each element has.

The element directory block 43 includes element blocks 44 each consisting of classification codes for the individual elements and stroke blocks 45 each describing detailed data of strokes that constitute each element.

Each stroke block 45 consists of classification codes of the individual strokes, part blocks each describing data of parts which constitute one stroke (e.g., origin coordinates or the like as viewed from the character coordinate system of the individual parts), and white space blocks. Stored in each white space block is data for controlling the intervals between strokes. This white space block has an X group number, a Y group number, a thinner flag and an delete flag.

Figure 1:
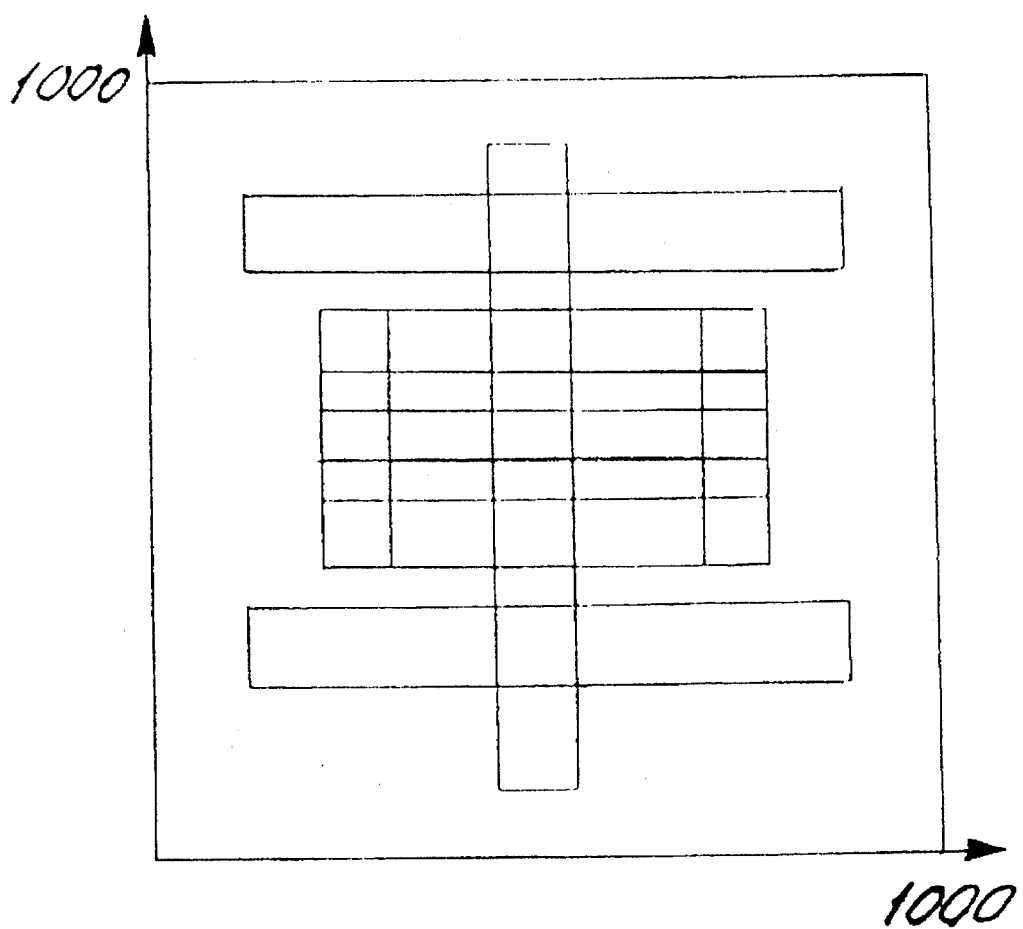
FIG. 1 is a diagram showing a Kanji character for explaining prior art.
Figure 2A:
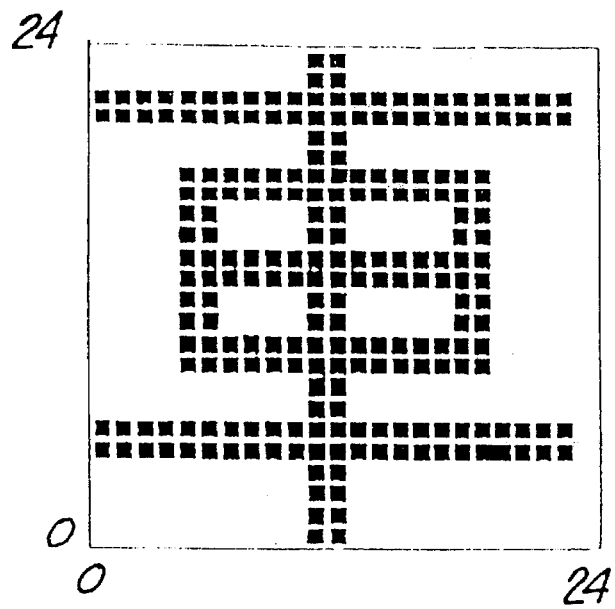
FIG. 2A is a diagram showing the Kanji character of FIG. 1 developed to 24×24 dots by the prior art.
Figure 2B:
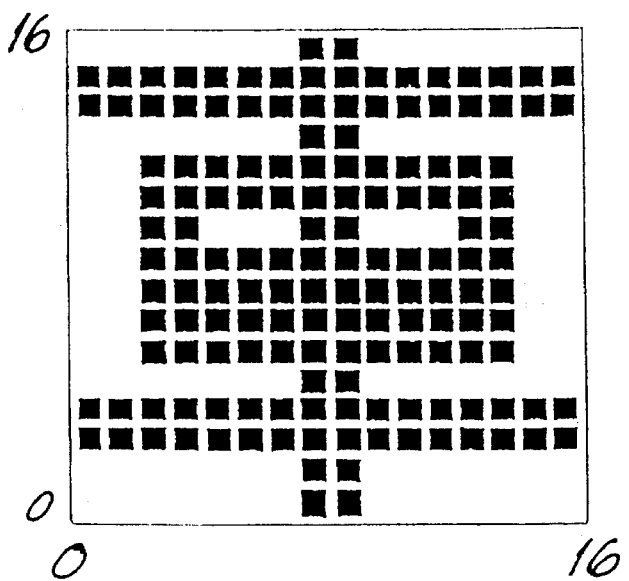
FIG. 2B is a diagram showing the Kanji character of FIG. 1 developed to 16×16 dots by the prior art.
Figure 3:
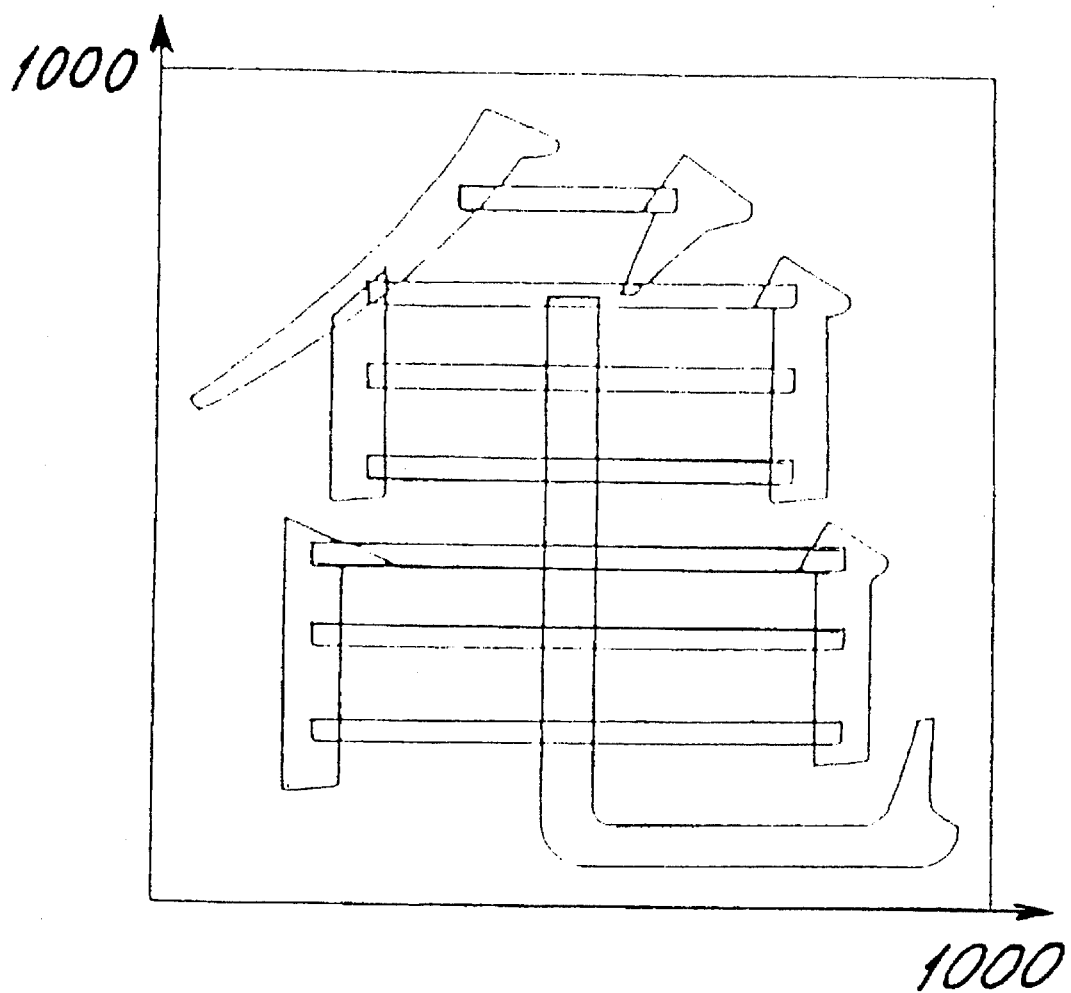
FIG. 3 is a diagram showing another Kanji character for explaining the prior art.
Figure 4A:
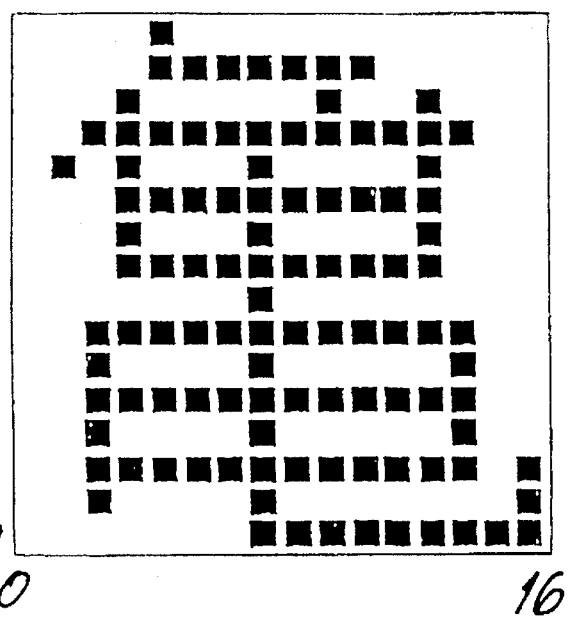
FIG. 4A is a diagram showing the Kanji character of FIG. 3 developed to 16×16 dots by the prior art.
Figure 4B:
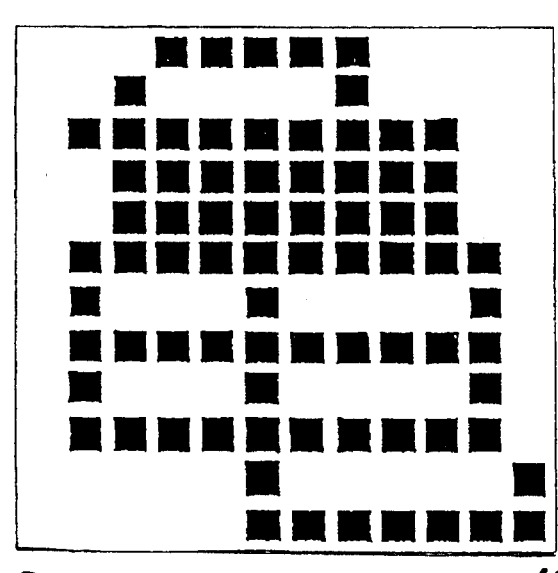
FIG. 4B is a diagram showing the Kanji character of FIG. 3 developed to 12×12 dots by the prior art.
Figure 5:
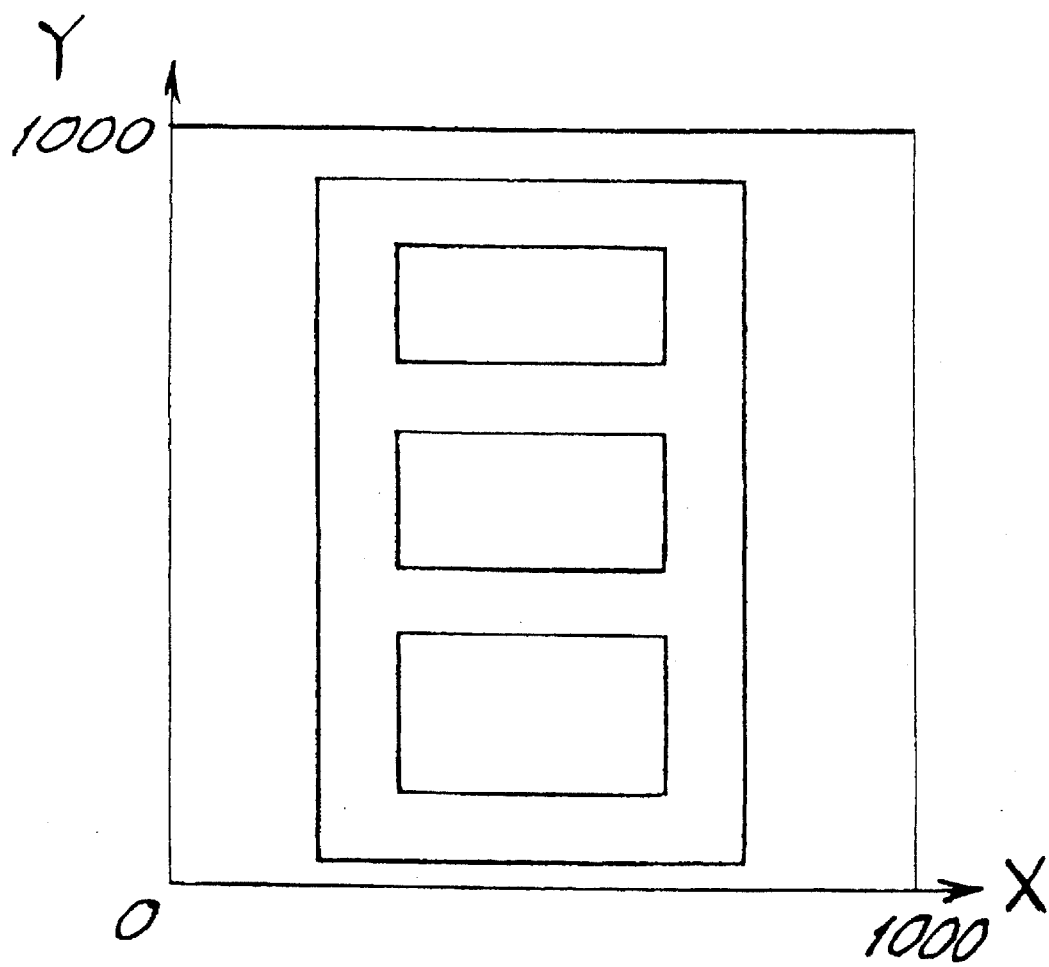
FIG. 5 is a diagram showing a different Kanji character for explaining the prior art.
Figure 6B:
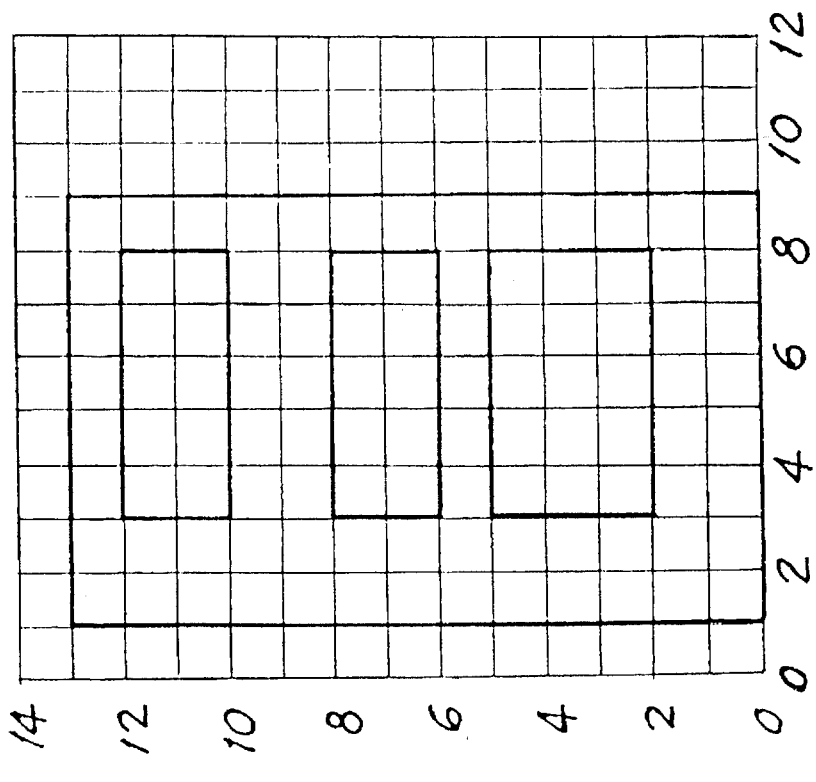
FIG. 6B is a diagram showing the coordinates of the Kanji character of FIG. 5 after a rounding process, as a pattern.
Figure 6A:
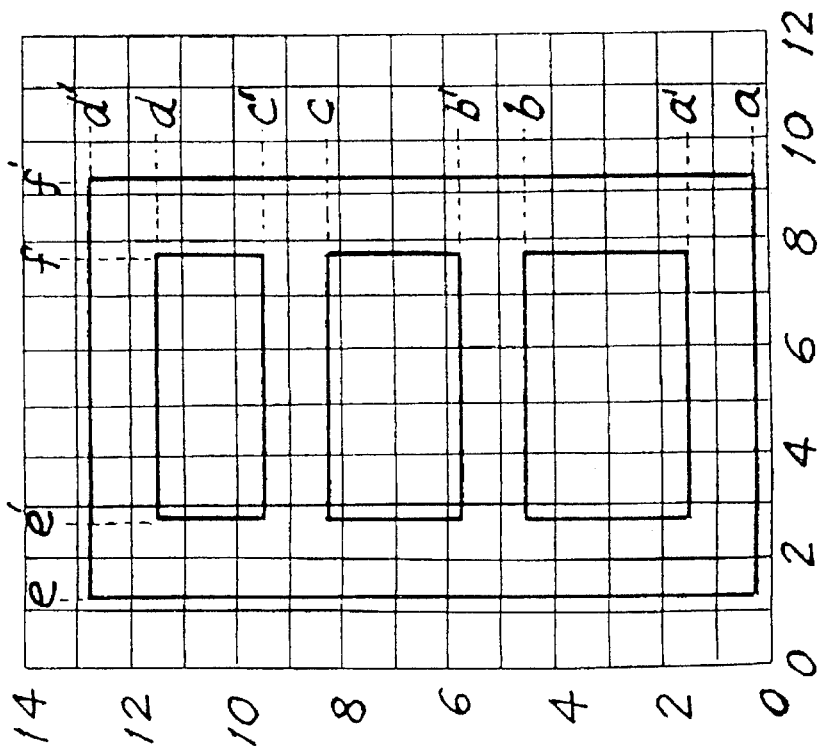
FIG. 6A is a diagram showing the coordinates of the Kanji character of FIG. 5 after coordinate conversion, as a pattern.
Figure 7A:
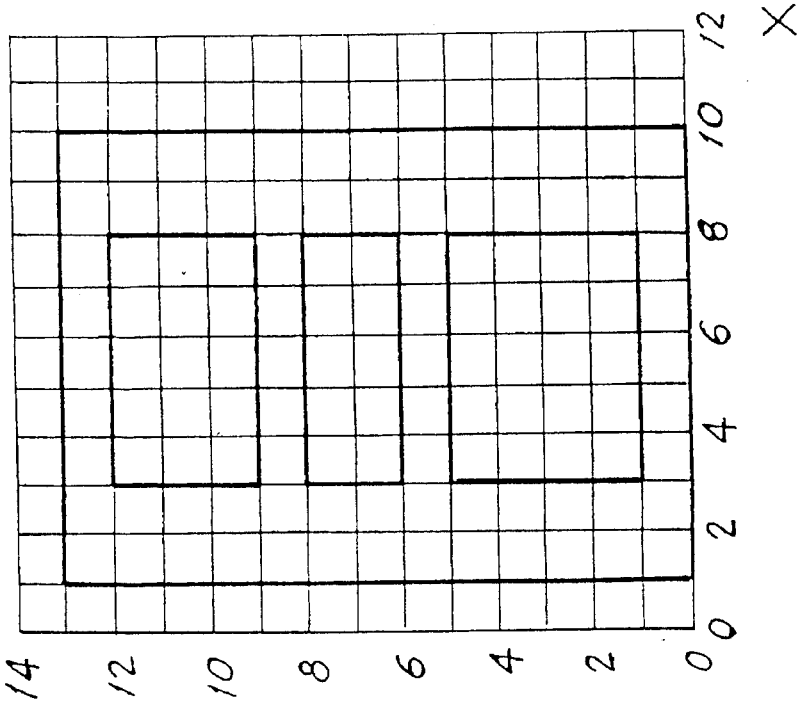
FIG. 7A is a diagram showing the coordinates of the Kanji character of FIG. 5 after coordinate conversion, as a pattern.
Figure 7B:
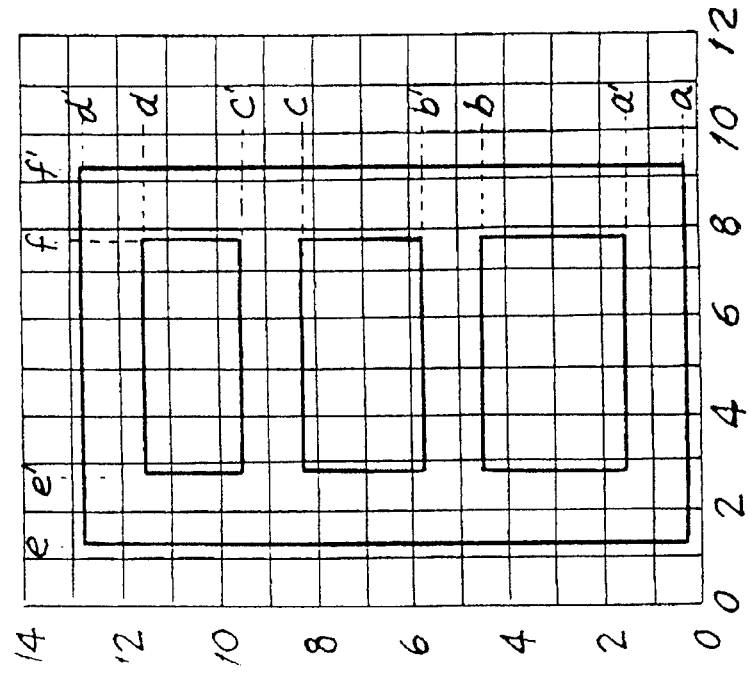
FIG. 7B is a diagram showing the coordinates of the Kanji character of FIG. 5 after a line-width retaining rounding process, as a pattern.

The X group number indicates if the stroke needs some control on the interval with another stroke or the like as viewed in the X direction. "0" is written in this X group number when the interval control is unnecessary, whereas when such control is necessary, the group number of the group of strokes which need stroke control is written there. For instance, the aforementioned Kanji character "Kuruma" shown in FIG. 1 has three vertical strokes. As those vertical strokes need interval control or the like in the X direction, the same group number (e.g., "1") is written in the X group number.

The Y group number indicates if the stroke needs some control of the interval with another stroke or the like as viewed in the Y direction. "0" is written in this Y group number when the interval control is unnecessary, whereas when such control is necessary, the group number of the group of strokes which need stroke control is written there. For example, the aforementioned Kanji character "Kuruma" shown in FIG. 1 has five horizontal strokes. As three of those horizontal strokes need stroke control in the Y direction, the same group number (e.g., "1") is written in the Y group number.

The thinner flag is provided to prevent the interval between lines from contacting each other in the case of a thick typeface. A stroke with the thinner flag of "1" is made thinner than the original one to keep the interval between lines.

The delete flag is provided to prevent adjacent strokes from contacting with each other when a character is developed to a very small bit map and the line has a width of one pixel and cannot be made thinner. A stroke with the delete flag of "1" is deleted to improve the readability.

Whether or not the designated character includes a stroke that needs adjustment is checked by sequentially reading the X group number and Y group number in the white space block in the structure data memory 4a. When a number other than "0" is written, the adjustment of the line width or line deletion is performed on those strokes which have the same group number.

When a character is broken down into parts, the contour data memory 4b has a data structure as shown in FIG. 14. More specifically, the contour data memory 4b includes a header block 46 where the type of a character set (Mincho, Gothic, etc.) and common data, such as the prepared date, are stored, a character pointer block 47 for searching for target data based on the character code, a part pointer block 48 for searching for images of parts constituting the designated character, a contour information block 49 describing part images as contour lines.

The part pointer block 48 is provided with part pointers 1 to n according to the order of the individual strokes. The part pointers 1 to n is provided with a flag indicating the end of a stroke. Supposing that one stroke has parts indicated by part pointers 1 and 2, the flag indicating the end of this stroke is set in the part pointer 2, making it clear to see which stroke corresponds to which parts.

With the above design, if the part pointer block 48 is provided for each character, the contour data of the individual parts of the contour information block 49 can be shared by many characters, thus ensuring the reduction of the capacity of the font memory.

Figure 15:
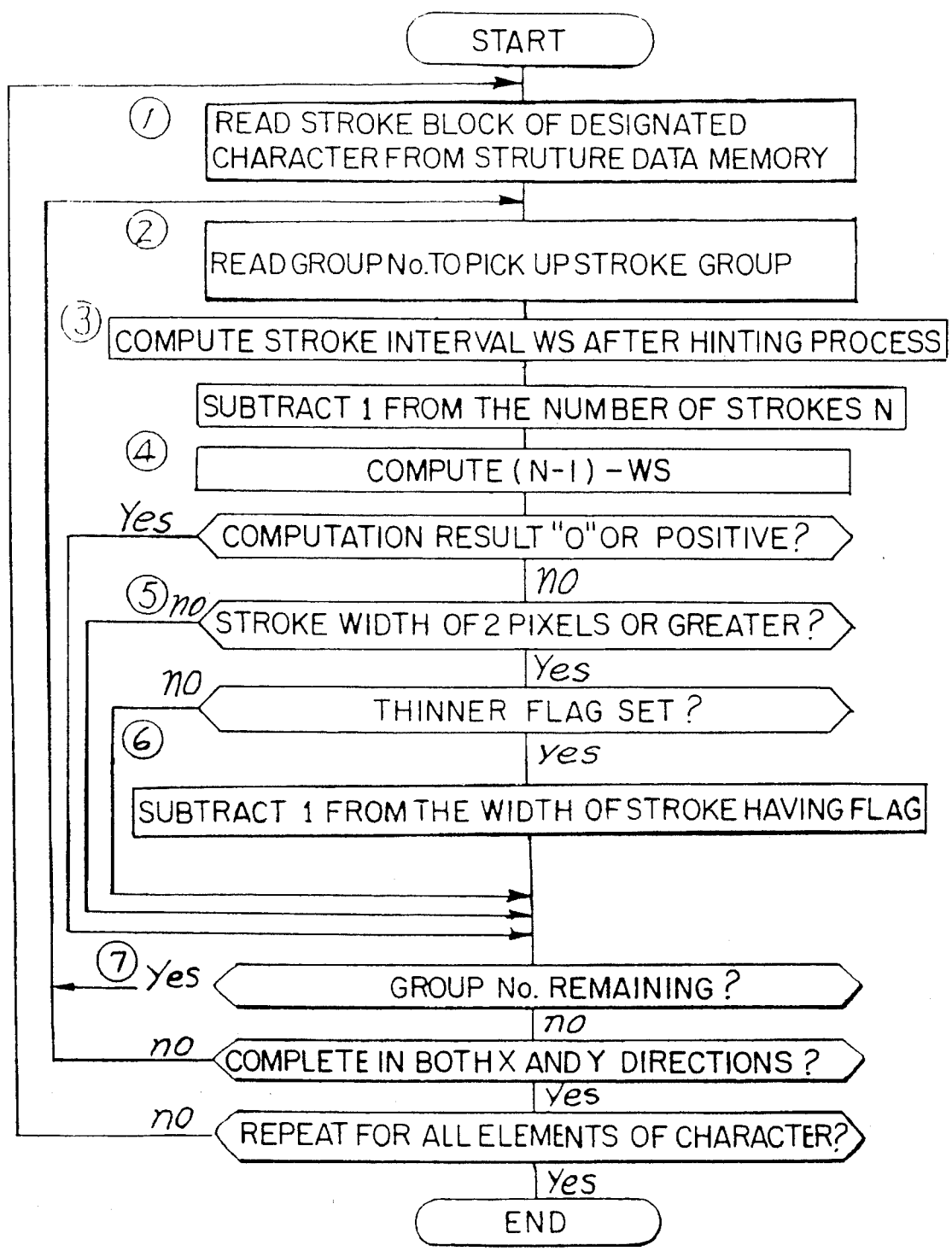
FIG. 15 is a flowchart according to the first embodiment of this invention.
Figure 16:
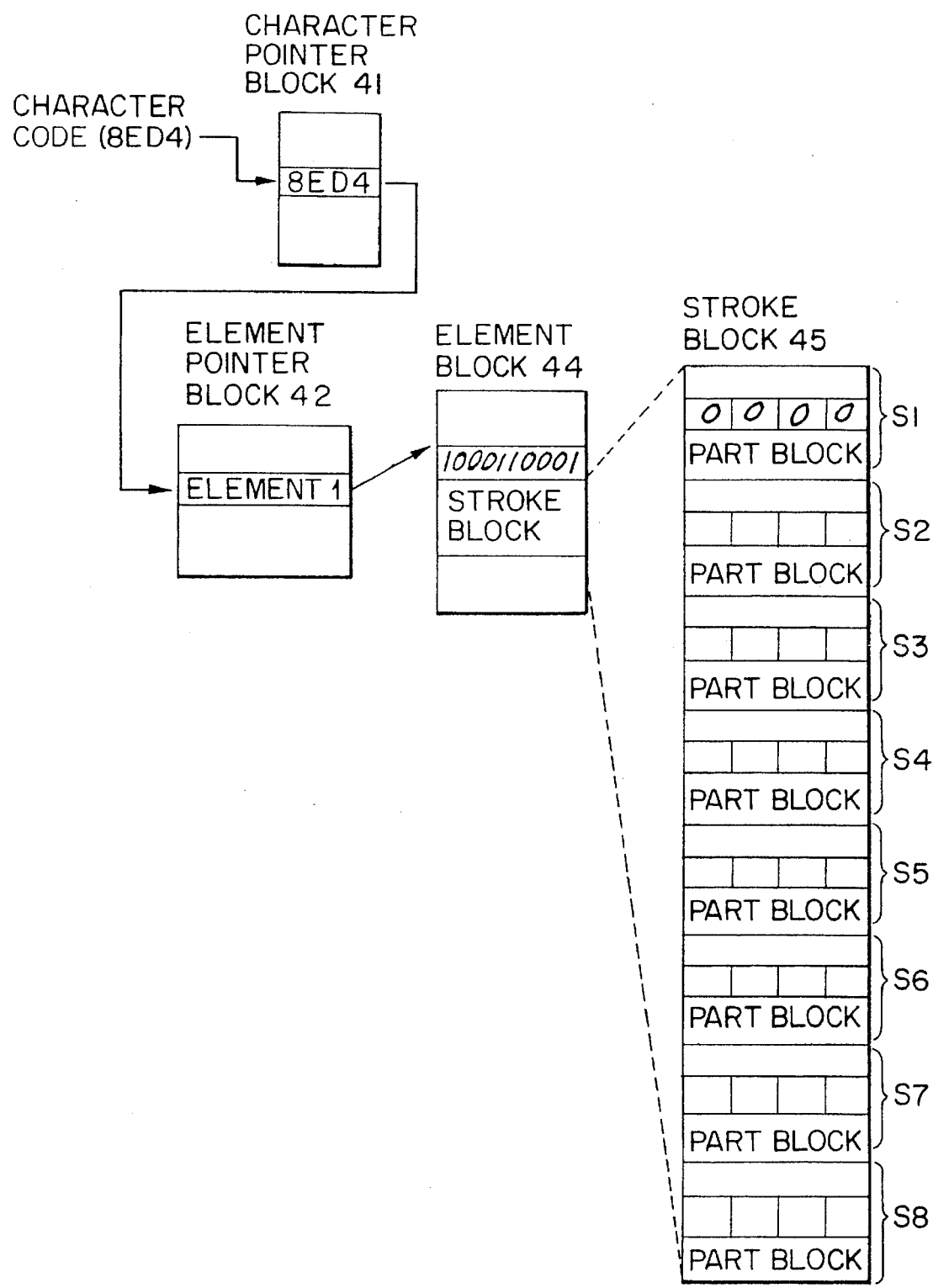
FIG. 16 is an explanatory diagram (part 1) for the character generating operation according to the first embodiment of this invention.
Figure 17:
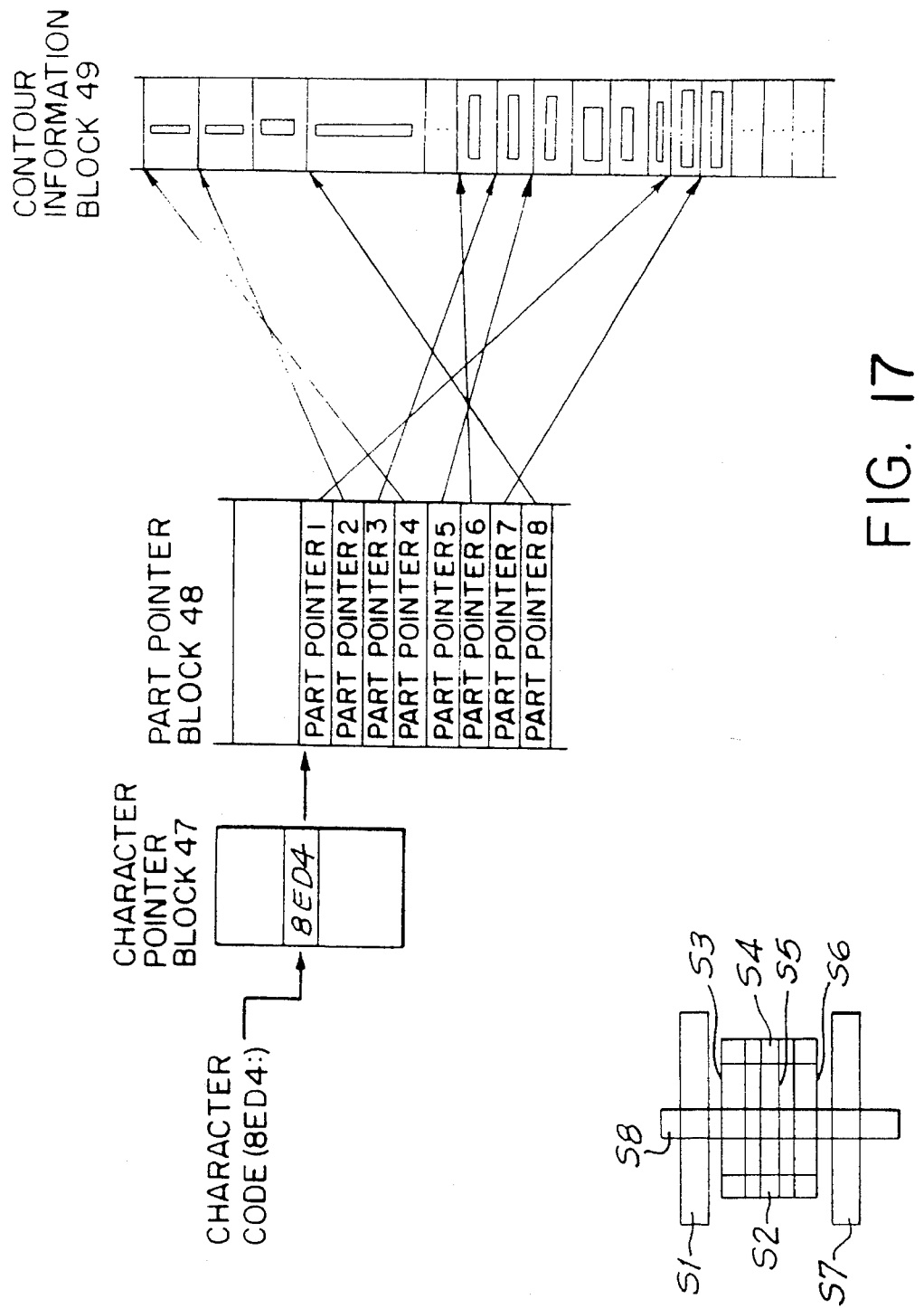
FIG. 17 is an explanatory diagram (part 2) for the character generating operation according to the first embodiment of this invention.
Figure 18:
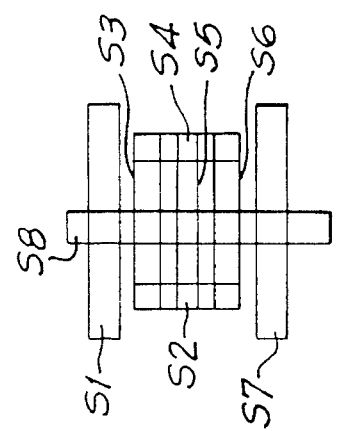
FIG. 18 is a diagram showing the pattern of a Kanji character used in the embodiment shown in FIGS. 16 and 17.

FIG. 15 is a flowchart according to the first embodiment of this invention, FIGS. 16 and 17 explanatory diagrams (part 1 and part 2) for the character generating operation according to the first embodiment of this invention, FIG. 18 shows the pattern of a Kanji character used in the embodiment, and FIG. 19 is an explanatory diagram for the character developing table in one embodiment of this invention.

First, a description will be given of the operation of generating a Gothic Kanji character "Kuruma" shown in FIG. 18, for example, from the font memory 4 with reference to FIGS. 16, 17 and 19. As shown in FIG. 16, the pointer for an element is obtained in the character pointer block 41 of the structure data memory 4a of the font memory 4 based on the character code "8ED4" of the Kanji character "Kuruma." Further, the pointer for the element block 44 where structure data is stored is obtained in the element pointer block 42.

As the Kanji character "Kuruma" consists of eight strokes S1 to S8, as shown in FIG. 18, data about the eight strokes S1–S8 constituting the Kanji character "Kuruma" is described in the stroke block 45 next to the classification code of the element in the element block 44. This example shows the data laid out in the stroking order of the character.

As the first stroke S1 is a horizontal line, it has a horizontal-line classification code "000010." A control flag portion where the X group number, Y group number, thinner flag and delete flag are arranged in the named order is "0000." That is, the group number for the stroke control in the Y direction is set to "0" and the thinner flag and delete flag are both "0." As the second stroke S2 is a vertical line, it has a vertical-line classification code "000001." And, this stroke has an X group number set to "1." Likewise, there are Y group numbers set to "1" for the third, fifth, sixth and seventh strokes S3, S5, S6 and S7, while there is an X group number set to "1" for the fourth stroke S4.

In other words, the Kanji character "Kuruma" has three adjustment strokes in the X direction and three adjustment strokes in the Y direction.

Since the fifth stroke S5 has a thinner flag of "1," if the horizontal strokes contact with each other with no interval to spare when the character is developed to a bit map by a thick typeface or the like, those lines are made thinner to maintain the interval.

Further, as the fifth stroke S5 has an delete flag of "1," if the horizontal strokes come very close to each other to be smeared out in black when a small bit map image is to be produced, this stroke is deleted to keep the interval between strokes.

Accordingly, based on the character code of the Kanji character "Kuruma," the contents of the associated stroke block 45 are read out from the structure data memory 4a. Similarly, the pointer for the part pointer block 48 is obtained from the character pointer block 47 based on the character code "8ED4" of the Kanji character "Kuruma" as shown in FIG. 17. Then, the associated contour data is obtained from the contour information block 49 in the part pointer block 48.

The enlarging/reducing circuit 30 shown in FIG. 12 enlarges or reduces the contour data of this part to contour data of the designated character size. For instance, to provide a size of 16 pixels for X and 16 pixels for Y in FIG. 8, the contour data of a character expressed by the 1000×1000 coordinate system is multiplied by 16/1000 in the X direction and also by 16/1000 in the Y direction.

The thus converted contour data is sent together with the data of the stroke block 45 to the hinting processor 31 in FIG. 12. The hinting processor 31 prepares the character developing table shown in FIG. 19. For each of the strokes constituting a character, as shown in FIG. 19, this character developing table contains a stroke number, coordinates of the stroke before rounding (X coordinate X1 of the left-hand side of the line width of a vertical stroke, X coordinate Xr of the right-hand side of the line width of the vertical stroke, Y coordinate Yb of the bottom side of the line width of a horizontal stroke, and Y coordinate Yu of the upper side of the line width of the horizontal stroke), coordinates of the stroke after rounding (X coordinate X1 of the left-hand side of the line width of a vertical stroke, X coordinate Xr of the right-hand side of the line width of the vertical stroke, Y coordinate Yb of the bottom side of the line width of a horizontal stroke, and Y coordinate Yu of the upper side of the line width of the horizontal stroke), a group number (X, Y), thinner flag (X, Y), delete flag (X, Y) and the contour data of that stroke.

Therefore, the hinting processor 31 stores the individual pieces of contour data, computed by the enlarging/reducing circuit 30, in the contour data column of the associated strokes in the character developing table shown in FIG. 19. Then, the hinting processor 31 stores the structure data of the strokes in the control flag column (group number (X, Y), thinner flag (X, Y), delete flag (X, Y)). The hinting processor 31 obtains the end coordinates of each stroke before rounding in accordance with the contour data and whether or not the stroke is a vertical stroke or horizontal stroke, and stores the coordinate data in the stroke coordinate column before rounding. Further, the hinting processor 31 performs a line-width retaining rounding process on the stroke coordinates before rounding. The hinting processor 31 then obtains stroke coordinates after rounding and stores them in the stroke coordinate column after rounding in the character developing table.

The above will be described with reference to a case where the Kanji character "Kuruma" shown in FIG. 18 is converted to a size of 16×16 dots in FIG. 8. As shown in FIG. 18, as the first stroke S1 is a horizontal stroke, the bottom Y coordinate Yb and the upper Y coordinate Yu of the line width of that horizontal stroke are obtained from the contour data after coordinate conversion. Yb and Yu are respectively 13.4 and 15.8, and are stored in the stroke column before rounding in the character developing table as shown in FIG. 19.

The coordinates are subjected to a line-width retaining rounding process, so that the bottom Y coordinate Yb of the line width of that horizontal stroke becomes "13" and the upper Y coordinate Yu of the line width of that horizontal stroke becomes "15" as shown in FIG. 8. The resultant Y coordinates are stored in the stroke column after rounding in the character developing table.

Thereafter, likewise, the stroke coordinates before rounding and the stroke coordinates after rounding are obtained for the second stroke S2, the third stroke S3, the fourth stroke S4, the fifth stroke S5, the sixth stroke S6, the seventh stroke S7 and the eighth stroke S8, and are stored in the character developing table. In this manner, the Kanji character "Kuruma" before rounding becomes as shown in FIG. 8 through the rounding process.

Using those pieces of data, the line-width adjusting process in FIG. 15 is executed by the stroke-interval calculator 32, comparator 33 and determining circuit 34 shown in FIG. 11.

(1) The hinting processor 31 reads a stroke block of an element of a designated character from the structure data memory 4a of the font memory 4. The hinting processor 31 then stores the contour data after coordinate conversion, obtained by the enlarging/reducing circuit 30, and the contents of that stroke block in the character developing table in FIG. 19.

(2) The hinting processor 31 reads the group number column in the character developing table to pick up the stroke groups having the same group number. The hinting processor 31 reads the stroke coordinates after the rounding process and gives them to the stroke-interval calculator 32. With regard to the aforementioned Kanji character "Kuruma," for instance, the three strokes S3, S5 and S6 are extracted as strokes of the same group from the character developing table. Then, the stroke coordinates after the rounding process are read out.

(3) The stroke-interval calculator 32 calculates the stroke interval WS after a hinting process from the stroke coordinates after the rounding process. In the example of FIG. 19, the two stroke intervals a1'–b1 and b1'–c1 are computed. a1' is the bottom Y coordinate Yb (=10) of the stroke S3, and b1 is the upper Y coordinate Yu (=9) of the stroke S5. b1' is the bottom Y coordinate Yb (=7) of the stroke S5, and c1 is the upper Y coordinate Yu (=7) of the stroke S6. Thus, the stroke interval WS after the hinting process becomes $$WS = (a1' - b1) + (b1' - c1)$$
$$= 10 - 9 + 7 - 7 = 1.$$

Next, 1 is subtracted from the total number of strokes N (=3) to obtain the number of white (blank) areas necessary for the N strokes; i.e., N–1=2.

(4) The comparator 33 subtracts the stroke interval WS from (N–1), and informs the determining circuit 34 of the result. The determining circuit 34 determines whether the comparison result is "0" or positive. If the comparison result is "0" or positive, which means that there is blank space between strokes, no line-thinning process is necessary. Thus, the flow advances to step (7).

(5) If the determining circuit 34 determines that the comparison result is negative, not "0" or positive, there is no sufficient space between strokes and the adjacent strokes are in contact. Thus, the determining circuit 34 instructs the hinting processor 31 to perform the line-thinning process on the strokes. As a result, the hinting processor 31 checks the line widths of the target N strokes from the coordinate values after the rounding process, and extracts that stroke which has a line width of two or greater pixels. If there is no stroke found which has a line width of two or more pixels, no lime-thinning process can be performed, so that the flow goes to step (7).

When detecting any stroke which has a line width of two or greater pixels, the hinting processor 31 looks up the thinner flag column in the character developing table to check if the thinner flag is set for that stroke. When no thinner flag is set for every stroke which has a line width of two or greater pixels, the line-thinning process will not be performed and the flow advances to step (7).

(6) The hinting processor 31 subtracts 1 from the line width of that stroke which has a line width of two or greater pixels and which has the thinner flag set. That is, the coordinates for that stroke after the rounding process in the character developing table are changed so that the line width becomes smaller by one pixel. In the example of FIG. 18, the middle stroke S5 of the element "Hi" in the Kanji character "Kuruma" has a line width of two or greater pixels has the thinner flag set. Thus, "1" is added to the bottom Y coordinate Yb for the stroke S5 after the rounding process in the character developing table, making it "8," and the line width is reduced by one pixel.

In this manner, the Kanji character "Kuruma" becomes as shown in FIG. 8, preventing the element "Hi" of the character "Kuruma" from being smeared out and allowing the appearance to approach the original character image.

If that stroke of the element excluding the outermost two strokes is to be subjected to a line-thinning process, the appearance of the resultant character becomes closer to the original character image. Thus, the thinner flag is set for the stroke of the element excluding the outermost two strokes (strokes S3 and S6 in this example).

(7) Next, the hinting processor 31 checks the group number column in the character developing table to check if there still is an unprocessed group number. If there is such an unprocessed group number, the hinting processor 31 returns to step (2).

If the hinting processor 31 determines that there is no unprocessed group number, it checks if adjustment has been completed for both the X and Y directions. When the adjustment has not been completed, the hinting processor 31 returns to step (2). When the adjustment has been completed, on the other hand, the hinting processor 31 determines if the above operation has been repeated for all the elements of the character. When the operation has not been completed for all the elements, the hinting processor 31 returns to step (1). When the operation has been completed for all the elements, the hinting processor 31 terminates the adjusting process.

When the adjustment is completed, the filling circuit 35 in the character developing circuit 3 performs drawing based on the contents of the character developing table to complete a bit map image.

Through the above operation, even for a reduced Kanji character "Kuruma," the bit map image close to the original character design can be obtained by adjusting the line width of the strokes, as shown in FIG. 8.

Figure 20:
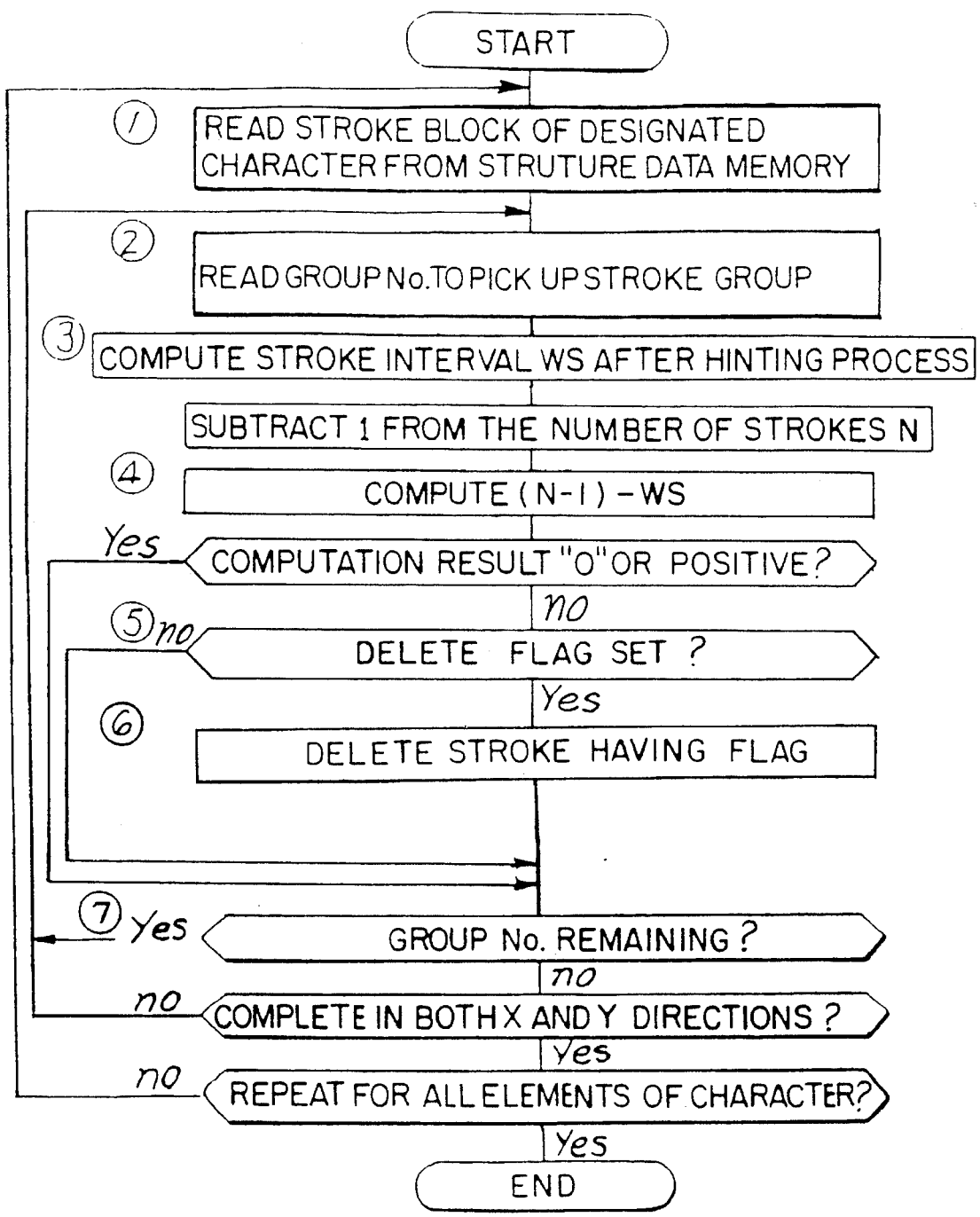
FIG. 20 is a flowchart according to the second embodiment of this invention.
Figure 21:
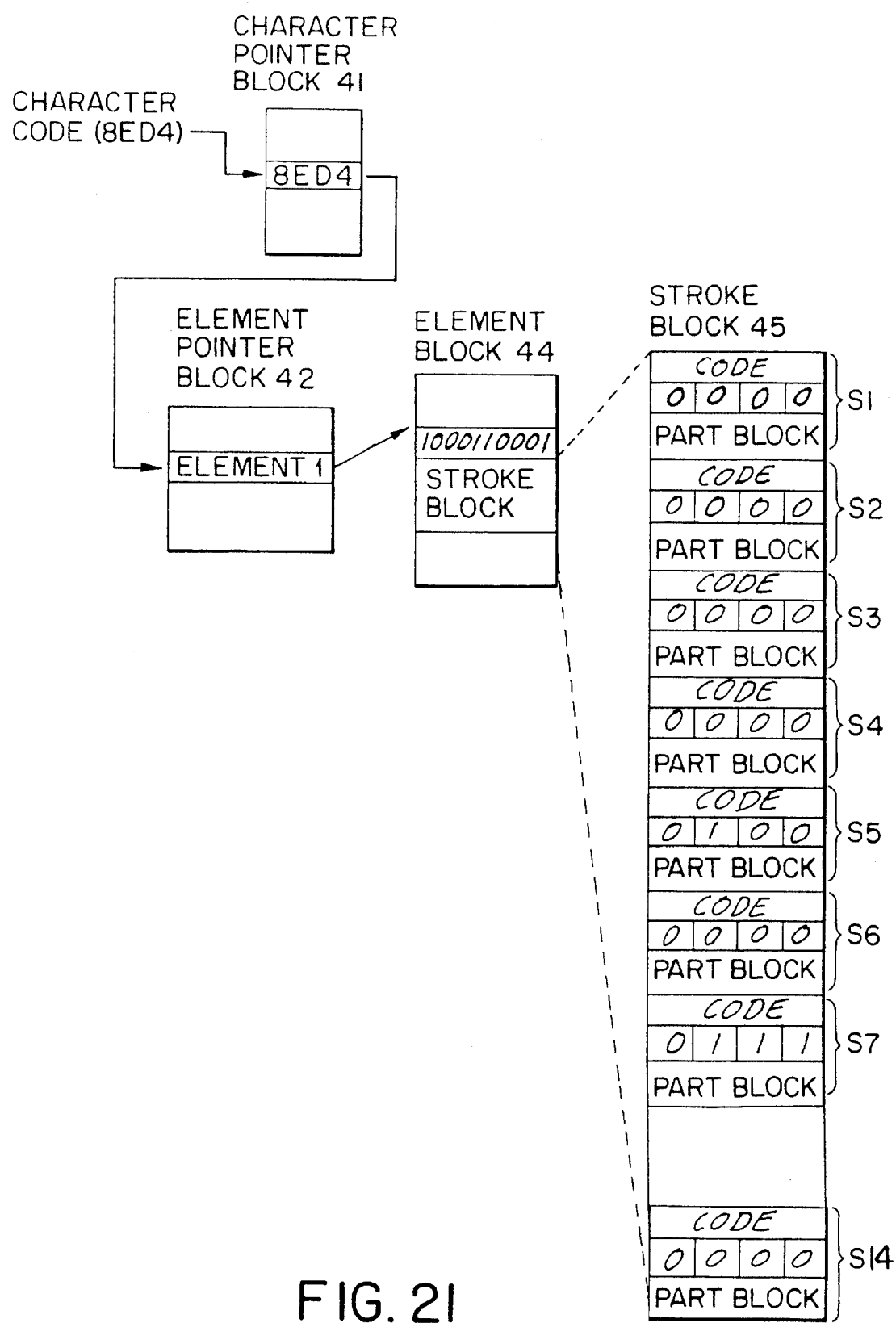
FIG. 21 is an explanatory diagram (part 1) for the character generating operation according to the second embodiment of this invention.
Figure 22:
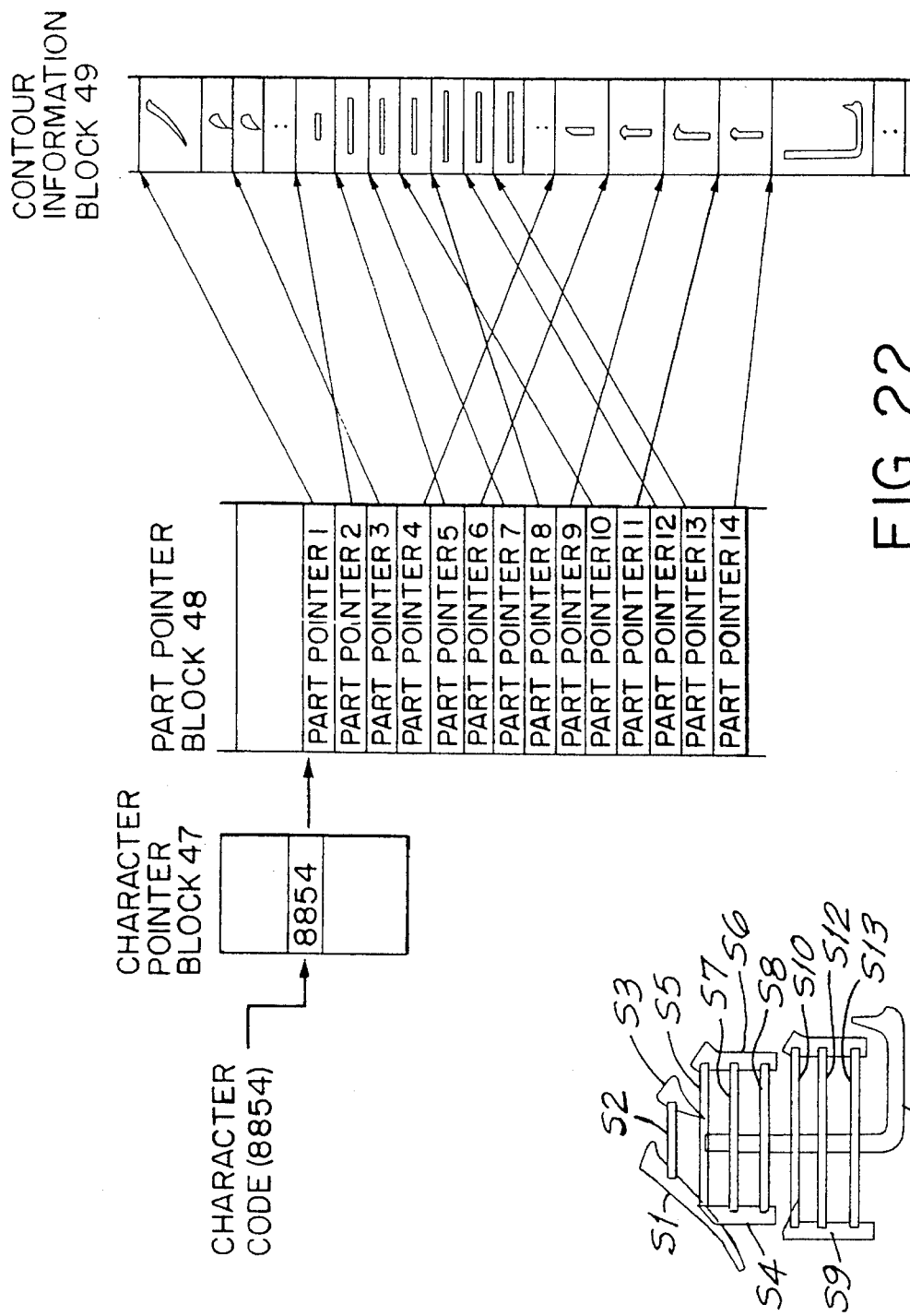
FIG. 22 is an explanatory diagram (part 2) for the character generating operation according to the second embodiment of this invention.
Figure 23:
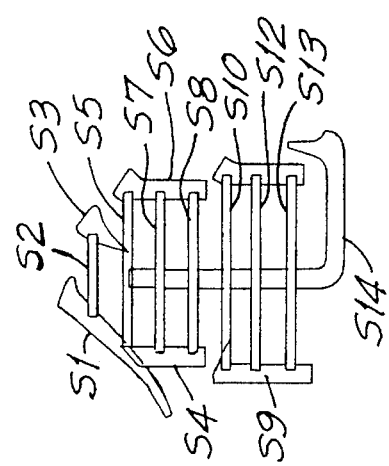
FIG. 23 is a diagram showing the pattern of a Kanji character used in the embodiment shown in FIGS. 21 and 22.

FIG. 20 is a flowchart according to the second embodiment of this invention, FIGS. 21 and 22 are explanatory diagrams (part 1 and part 2) for the character generating operation according to the second embodiment of this invention, FIG. 23 shows a character pattern used in the embodiment, and FIG. 24 is an explanatory diagram for the character developing table in one embodiment of this invention.

First, a description will be given of the operation of generating a Kanji character "Kame" shown in FIG. 23, for example, from the font memory 4 with reference to FIGS. 21, 22 and 24.

As shown in FIG. 21, the pointer for an element is obtained in the character pointer block 41 of the structure data memory 4a of the font memory 4 based on the character code "8B54" of the Kanji character "Kame." Further, the pointer for the element block 44 where structure data is stored is obtained in the element pointer block 42. As the Kanji character "Kame" consists of fourteen strokes S1 to S14, as shown in FIG. 23, data about the fourteen strokes S1–S14 constituting the Kanji character "Kame" is described in the stroke block 45 next to the classification code of the element in the element block 44. This example shows the data laid out in the stroking order of the character.

As the first stroke S1 is an oblique line, it has an oblique-line classification code, and a control flag portion where the X group number, Y group number, thinner flag and delete flag are arranged in the named order is "0000." That is, the group numbers for the stroke control in the X and Y directions are set to "0" and the thinner flag and delete flag are both "0." As the second stroke S2 is a horizontal line, this stroke has a horizontal-line classification code, and has group numbers of the stroke control in both the X and Y directions set to "0." The thinner flag and delete flag are both "0."

In other words, for the Kanji character "Kame," as shown in FIG. 24, the strokes S9, S11 and S14 are set to the group of the X directional adjustment, the strokes S5, S7 and S8 are set to the first group of the Y directional adjustment, and the strokes S10, S12 and S13 are set to the second group of the Y directional adjustment.

The seventh stroke S7 and the twelfth stroke S12 both have a thinner flag of "1." If the horizontal strokes contact with each other with no interval to spare when the character is developed to a bit map by a thick typeface or the like, therefore, those lines are made thinner to maintain the interval as per the first embodiment.

Further, as the seventh stroke S7 and the twelfth stroke S12 both have an delete flag of "1." If the horizontal strokes come very close to each other to be smeared out in black when a small bit map image is to be produced, therefore, this stroke is deleted to keep the interval between strokes.

Accordingly, based on the character code of the Kanji character "Kame," the contents of the associated stroke block 45 are read out from the structure data memory 4a. Similarly, the pointer for the part pointer block 48 is obtained from the character pointer block 47 based on the character code "8B54" of the Kanji character "Kame" as shown in FIG. 22. Then, the associated contour data is obtained from the contour information block 49 in the part pointer block 48.

The enlarging/reducing circuit 30 already explained referring to FIG. 12 enlarges or reduces this contour data to contour data of the designated character size. For instance, to provide a size of 12 pixels for X and 12 pixels for Y in FIG. 9, the contour data of a character expressed by the 1000×1000 coordinate system is multiplied by 12/1000 in the X direction and also by 12/1000 in the Y direction.

The thus converted contour data is sent together with the data of the stroke block 45 to the hinting processor in FIG. 12. The hinting processor 31 prepares the character developing table shown in FIG. 24.

For each of the strokes constituting a character, as shown in FIG. 24, this character developing table contains a stroke number, coordinates of the stroke before rounding (X coordinate X1 of the left-hand side of the line width of a vertical stroke, X coordinate Xr of the right-hand side of the line width of the vertical stroke, Y coordinate Yb of the bottom side of the line width of a horizontal stroke, and Y coordinate Yu of the upper side of the line width of the horizontal stroke), coordinates of the stroke after rounding (X coordinate X1 of the left-hand side of the line width of a vertical stroke, X coordinate Xr of the right-hand side of the line width of the vertical stroke, Y coordinate Yb of the bottom side of the line width of a horizontal stroke, and Y coordinate Yu of the upper side of the line width of the horizontal stroke), a group number (X, Y), thinner flag (X, Y), erase flag (X, Y) and the contour data of that stroke.

Therefore, the hinting processor 31 stores the individual pieces of contour data, computed by the enlarging/reducing circuit 30, in the contour data column of the associated strokes in the character developing table. Then, the hinting processor 31 stores the structure data of the strokes in the control flag column (group number (X, Y), thinner flag (X, Y), delete flag (X, Y)). The hinting processor 31 obtains the coordinates of each stroke before rounding in accordance with the contour data and whether or not the stroke is a vertical stroke or horizontal stroke, and stores the coordinate data in the stroke coordinate column before rounding.

Further, the hinting processor 31 performs a line-width retaining rounding process on the stroke coordinates before rounding to obtain stroke coordinates after rounding. The hinting processor 31 then stores those coordinates in the stroke coordinate column after rounding in the character developing table.

The above will be described with reference to case where the Kanji character "Kame" shown in FIGS. 21 and 22 is converted to a size of 12×12 dots in FIG. 9. As shown in FIG. 23, as the second stroke S2 is a horizontal stroke, the bottom Y coordinate Yb and the upper Y coordinate Yu of the line width of that horizontal stroke are obtained from the contour data after coordinate conversion. The Y coordinates Yb and Yu are respectively 11.5 and 12.1, and are stored in the stroke column before rounding in the character developing table.

The coordinates are subjected to a line-width retaining rounding process, so that the bottom Y coordinate Yb of the line width of the second horizontal stroke S2 becomes "11" and the upper Y coordinate Yu of the line width of that horizontal stroke S2 becomes "12" as shown in FIG. 9. The resultant Y coordinates are stored in the stroke column after rounding in the character developing table. Thereafter, similarly, the stroke coordinates before rounding and the stroke coordinates after rounding are obtained for the vertical and horizontal stroke S4, S5, S6, S7, S8, S9, S10, S11, S12, S13 and S14, except for the oblique line, and are stored in the character developing table. In this manner, the Kanji character "Kame" before rounding becomes as shown in FIG. 9 through the rounding process.

Using those pieces of data, the stroke deleting/adjusting process in FIG. 20 is executed by the stroke-interval calculator 32, comparator 33 and determining circuit 34 shown in FIG. 12.

(1) The hinting processor 31 reads a stroke block of an element of a designated character from the structure data memory 4a of the font memory 4. The hinting processor 31 then stores the contour data, obtained by the enlarging/reducing circuit 30, and the contents of that stroke block in the character developing table in FIG. 24.

(2) The hinting processor 31 reads the group number column in the character developing table to pick up the stroke groups having the same group number. The hinting processor 31 reads the stroke coordinates after the rounding process and gives them to the stroke-interval calculator 32. With regard to the Kanji character "Kame" shown in FIG. 23, for instance, the three strokes S5, S7 and S8 are extracted as strokes of the same group from the character developing table, and then, the stroke coordinates after the rounding process are read out.

(3) The stroke-interval calculator 32 calculates the stroke interval WS after a hinting process from the stroke coordinates after the rounding process.

In the example of FIG. 24, the two stroke intervals a1'–b1 and b1'–c1 are computed. a1' is the bottom Y coordinate Yb (=9) of the stroke S5, and b1 is the upper Y coordinate Yu (=9) of the stroke S7. b1' is the bottom Y coordinate Yb (=8) of the stroke S7, and c1 is the upper Y coordinate Yu (=8) of the stroke S8. Thus, the stroke interval WS after the hinting process becomes $$WS = (a1' - b1) + (b1' - c1)$$
$$= 9 - 9 + 8 - 8 = 0.$$

Next, 1 is subtracted from the total number of strokes N (=3) to obtain the number of white (blank) areas necessary for the N strokes; i.e., N−1=2.

(4) The comparator 33 subtracts the stroke interval WS from (N−1), and informs the determining circuit 34 of the result. The determining circuit 34 determines whether the comparison result is "0" or positive. If the comparison result is "0" or positive, which means that there is blank space between strokes, no line deletion is necessary. Thus, the flow advances to step (7).

(5) If the determining circuit 34 determines that the comparison result is negative, not "0" or positive, there is no sufficient space between strokes and the adjacent strokes are in contact. Thus, the determining circuit 34 instructs the hinting processor 31 to perform stroke deletion. As a result, the hinting processor 31 looks up the delete flag column in the character developing table to check if the delete flag is set for that stroke. When no delete flag is set for every target stroke, the line deleting process will not be performed and the flow advances to step (7).

(6) Upon detection of a stroke having the delete flag set, the hinting processor 31 deletes this stroke. That is, the bottom and upper coordinates for that stroke after the rounding process in the character developing table are made equal to each other in the Y direction. In the example of FIG. 9, the middle stroke S7 of the upper element "Hi" in the Kanji character "Kame" has the delete flag set. Thus, "1" is added to the bottom Y coordinate Yb for the stroke S7 after the rounding process in the character developing table to be "9," thus making the line width to 0 and deleting the stroke as a consequence.

In this manner, the Kanji character "Kame" becomes as shown in FIG. 9, preventing the upper element "Hi" of the character "Kame" from being smeared out and allowing the appearance to approach the original character image.

If that stroke of the element excluding the outermost two strokes is to be subjected to line deletion, the appearance of the resultant character becomes closer to the original character image. Thus, the delete flag is set for the stroke of the element excluding the outermost two strokes (strokes S5 and S8 in this example).

(7) Next, the hinting processor 31 checks the group number column in the character developing table to check if there still is an unprocessed group number. If there is such an unprocessed group number, the hinting processor 31 returns to step (2). If the hinting processor 31 determines that there is no unprocessed group number, it checks if adjustment has been completed for both the X and Y directions. When the adjustment has not been completed, the hinting processor 31 returns to step (2). When the adjustment has been completed, on the other hand, the hinting processor 31 determines if the above operation has been repeated for all the elements of the character. When the operation has not been completed for all the elements, the hinting processor 31 returns to step (1). When the operation has been completed for all the elements, the hinting processor 31 terminates the adjusting process.

When the adjustment is completed, the filling circuit 35 in the character developing circuit 3 performs drawing based on the contents of the character developing table to complete a bit map image.

Through the above operation, even for a reduced Kanji character "Kame," the bit map image close to the original character design can be obtained by adjusting the line width of the strokes, as shown in FIG. 9.

In those embodiments, typically, when the outermost strokes of a character are thick, the readability is high so that the outermost strokes will not be made thinner or deleted. If a stroke having a width of one pixel is made thinner, the stroke will be deleted, so that strokes having a width of two pixels or greater are to be made thinner.

To make a target stroke thinner, the coordinates of the stroke before development into a bit map image are altered, thus easily making the stroke thinner. Further, it is possible to designate a stroke, which can keep the readability even when made thinner on the character design, by making the line width thinner in advance or setting a stroke to be deleted in advance. Furthermore, it is possible to easily recognize a stroke to be made thinner, thus ensuring stroke adjustment that matches with the original character design.

Although the description of the first embodiment has been given with reference to the Kanji character "Kuruma," this embodiment may be applied to other Kanji characters having parallel horizontal strokes, like the Kanji character "Kame." Although the description of the second embodiment has been given with reference to the upper element "Hi" of the Kanji character "Kame," this the lower element "Hi" may also be checked. Likewise, the second embodiment may also be applied to other Kanji characters having parallel vertical strokes, like the Kanji character "Kuruma." Further, the first and second embodiments may be combined so that the line-thinning process of the first embodiment will be performed for a stroke having a width of two pixels or greater, and the line deleting process of the second embodiment will be performed for a stroke whose width is less than two pixels. The origin of a part expressed in the character coordinate system may be set, so that contour data may be expressed by the relative positions from this origin. Although the font memory has been explained as a part-segmenting type, it may be a stroke-segmenting type.

Figure 25:
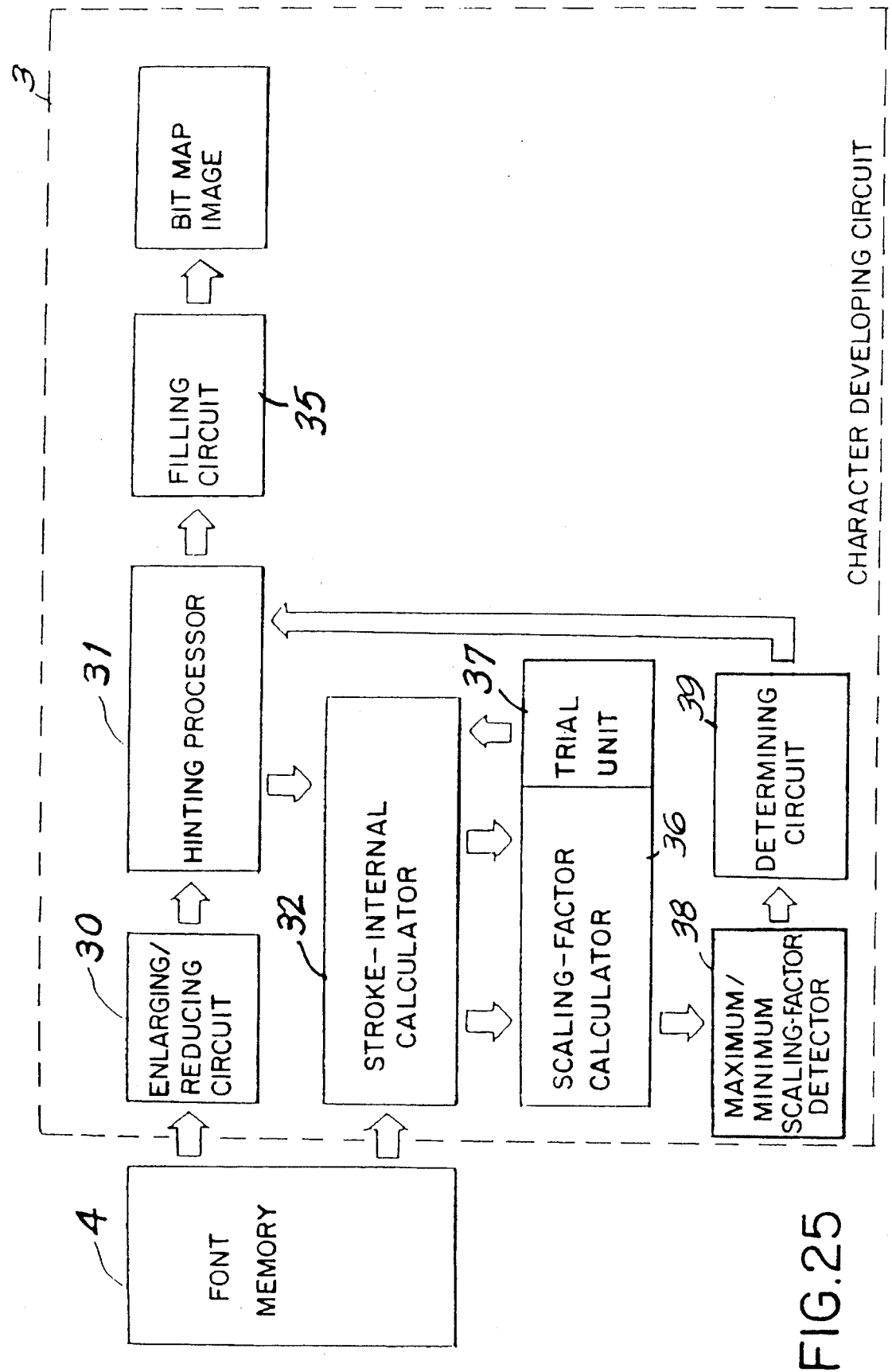
FIG. 25 is a block diagram of a character developing section according to the third embodiment of this invention.
Figure 26:
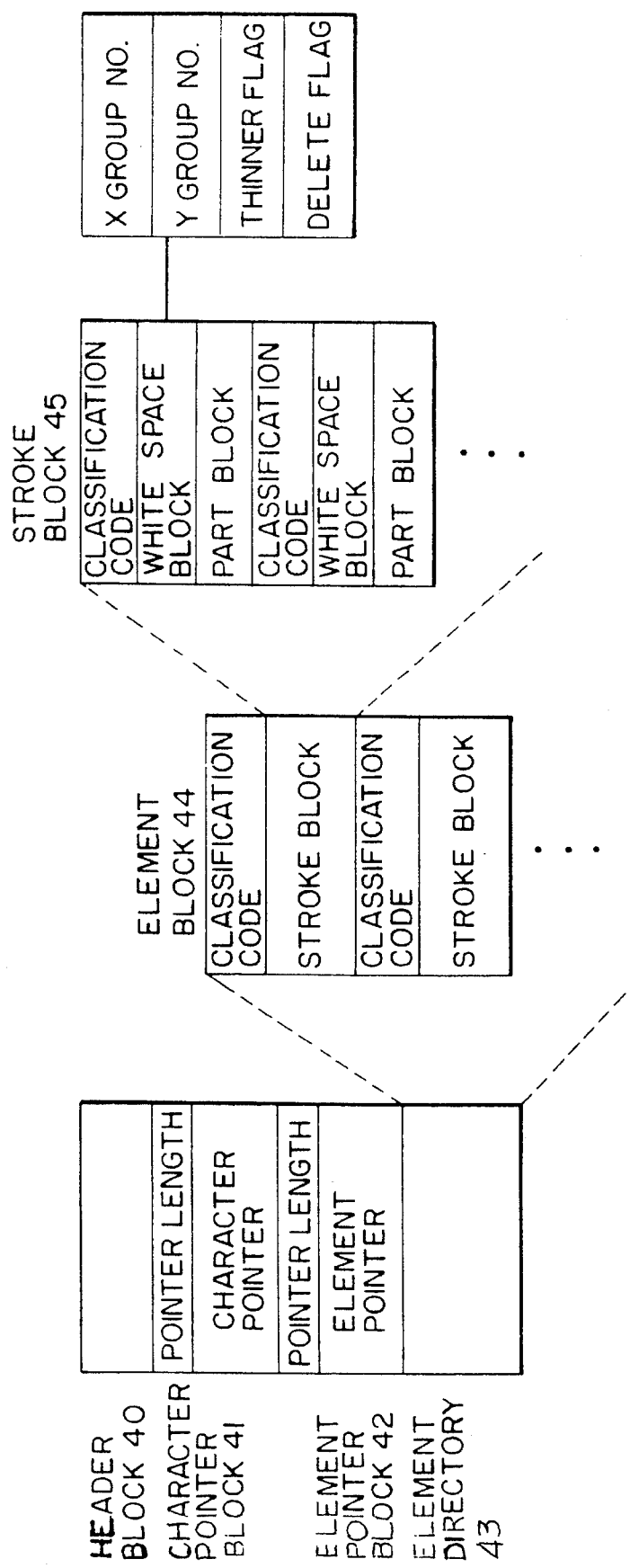
FIG. 26 is a diagram (part 1) showing the structure of a font memory of the embodiment in FIG. 25.
Figure 27:
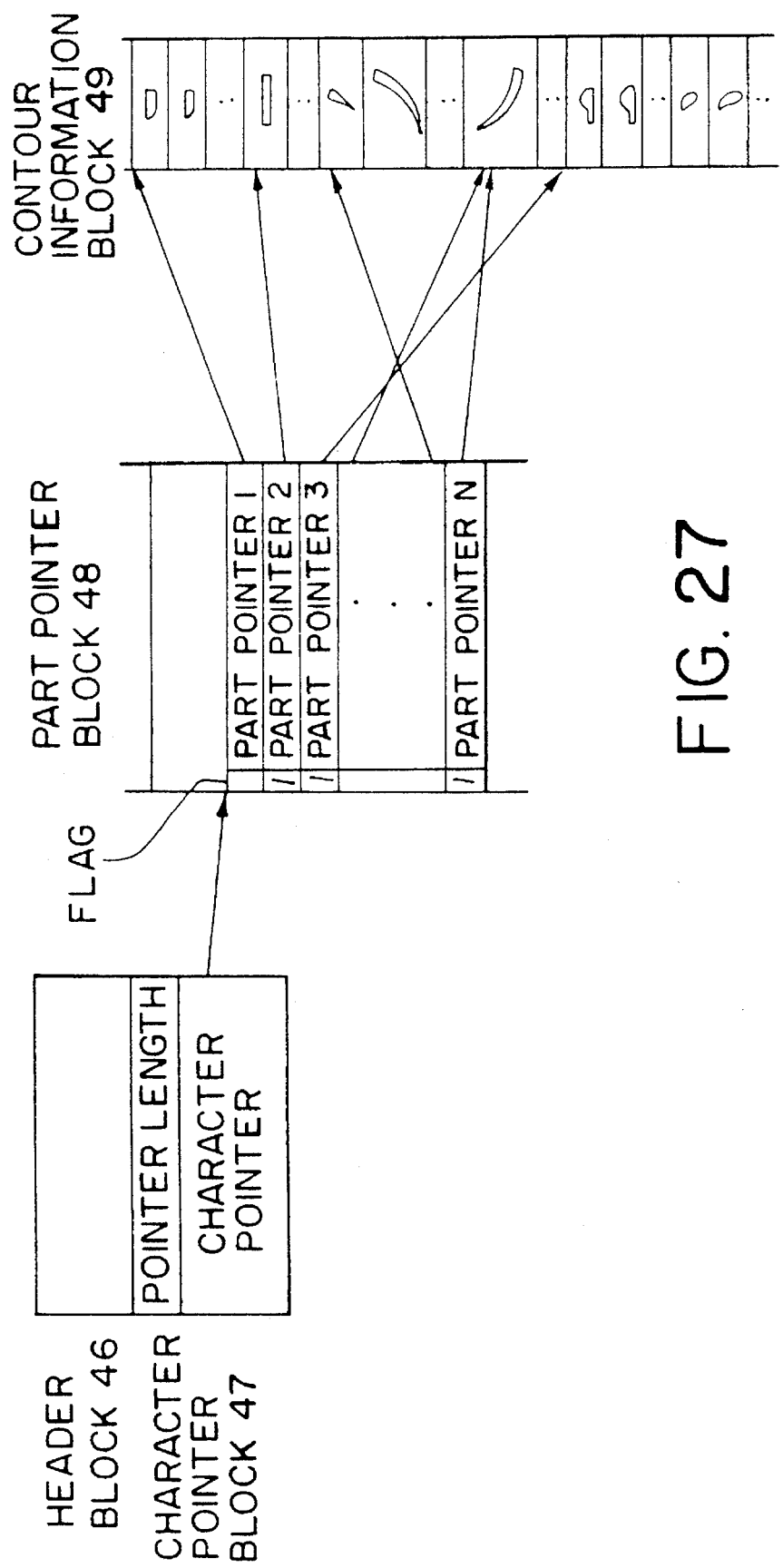
FIG. 27 is a diagram (part 2) showing the structure of the font memory of the embodiment in FIG. 25.

The third embodiment will now be described. The structure of a character generating apparatus according to this embodiment is the same as the one shown in FIG. 11. FIG. 25 is a block diagram of a character developing circuit 3, and FIGS. 26 and 27 are diagrams (part 1 and part 2) showing the structure of a font memory.

FIG. 25 presents the detailed illustration in block of the character developing circuit 3. The enlarging/reducing circuit 30 enlarges or reduces the character outline data corresponding to the character code from the font memory 4 so that the data will have the designated character size. The hinting processor 31 has a table (which will be described later referring to FIG. 32) for holding data before a hinting process and data thereafter for each stroke, and executes a rounding (hinting) process or the like to adjust the line width or position to thereby improve the character quality of a bit map. The stroke-interval calculator 32 calculates the intervals between horizontal strokes or vertical strokes after the hinting (rounding) process, and the intervals between horizontal strokes or vertical strokes before the hinting process. A scaling-factor calculator 36 calculates a scaling factor between a stroke interval before the hinting process and a stroke interval after that process. A maximum/minimum scaling-factor detector 38 detects the largest and smallest scaling factors and computes the difference therebetween. A trial unit 37 instructs the stroke-interval calculator 32 to add one pixel to the stroke interval after the hinting process, which provides the smallest scaling factor, and to subtract one pixel from the stroke interval after the hinting process, which provides the largest scaling factor. A determining circuit 39 compares the difference between the largest and smallest scaling factors before the trial with the difference between the largest and smallest scaling factors after the trial. The determining circuit 39 feeds the computation result after the trial back to the hinting processor 31 when the difference has been made smaller by the trial, and feeds the computation result before the trial back to the hinting processor 31 when the difference has not been made smaller by the trial. The filling circuit 35 fills inside the contour lines in accordance with the contour data from the hinting processor 31 to complete a bit map image.

The character developing circuit 3 is constituted of a processor, and their block circuits 30 to 39 are functional blocks of the software of this processor.

The operations of the character developing circuit 3 will be described below. The character developing circuit 3 searches the font memory 4 for designated character data (outline data), and allows the enlarging/reducing circuit 30 to enlarge or reduce that data to the designated size. The hinting processor 31 stores the coordinate data after the enlargement/reduction in the table, and rounds this data to obtain coordinate data after a hinting process. The resultant coordinate data is stored in the table. This data is given to the stroke-interval calculator 32. The stroke-interval calculator 32 calculates the intervals between horizontal strokes or vertical strokes after the hinting process, and the intervals between horizontal strokes or vertical strokes before the hinting process. The scaling-factor calculator 36 calculates a scaling factor based on the intervals computed by the stroke-interval calculator 32. The maximum/minimum scaling-factor detector 38 detects the largest and smallest scaling factors among the computed scaling factors. This detector 38 computes the difference (first difference) between the two scaling factors and temporarily registers it in the determining circuit 39.

The trial unit 37 instructs the stroke-interval calculator 32 to try adding one pixel to the stroke interval after the hinting process, which provides the smallest scaling factor, and subtracting one pixel from the stroke interval after the hinting process, which provides the largest scaling factor. The stroke-interval calculator 32 computes the stroke intervals after the hinting process according to the instruction, and outputs the computation result to the scaling-factor calculator 36. The scaling-factor calculator 36 calculates the stroke-interval corrected scaling factors after the hinting process. The maximum/minimum scaling-factor detector 38 computes the difference (second difference) between the largest and smallest scaling factors, and sends it to the determining circuit 39.

The determining circuit 39 compares the first difference, held temporarily, with the second difference after the trial, feeds the computation result after the trial back to the hinting processor 31 when the difference has been made smaller by the trial, and feeds the computation result before the trial back to the hinting processor 31 when the difference has not been made smaller by the trial. When the trial is unsuccessful, the hinting processor 31 performs no particular process and gives the data after the hinting process to the filling circuit 35. When the trial is successful, the hinting processor 31 prepares data after the hinting process, which is obtained by shifting the stroke, located between the stroke interval which provides the largest scaling factor and the stroke interval which provides the smallest scaling factor, by one pixel toward the stroke interval with the largest scaling factor, and sends the resultant data to the filling circuit 35. Finally, the filling circuit 35 fills inside the contour lines in accordance with the received contour data from the hinting processor 31 to complete a bit map image.

The structure of the font memory 4 will be described referring to FIGS. 26 and 27. Like the description of FIGS. 13 and 14, this description will be given with reference to the case where a character is broken down in a hierarchical structure for purpose of storage to elements corresponding to the left-hand radical and the right-hand radical, constituting that character, strokes corresponding to the brush movements, and parts corresponding to the stroking start portion and stroking end portion. Further, in this description it will be explained that in order to reduce the amount of data, the font memory 4 comprises the structure data memory 4a in FIG. 26 For storing the hierarchical structures and characteristic data of characters, and a contour data memory 4b for storing contour data of each character broken down to strokes or parts.

As shown in FIG. 26, the structure data memory 4a has the same structure as the one shown in FIG. 13. Whether or not the designated character includes a stroke that needs adjustment is checked by sequentially reading the X group number and Y group number in the white space block in the structure data memory 4a. When a number other than "0" is written, the interval adjustment is performed on those strokes which have the same group number.

When a character is broken down to parts, the contour data memory 4b has a data structure as shown in FIG. 27, This structure is the same as the one shown in FIG. 14.

Figure 28:
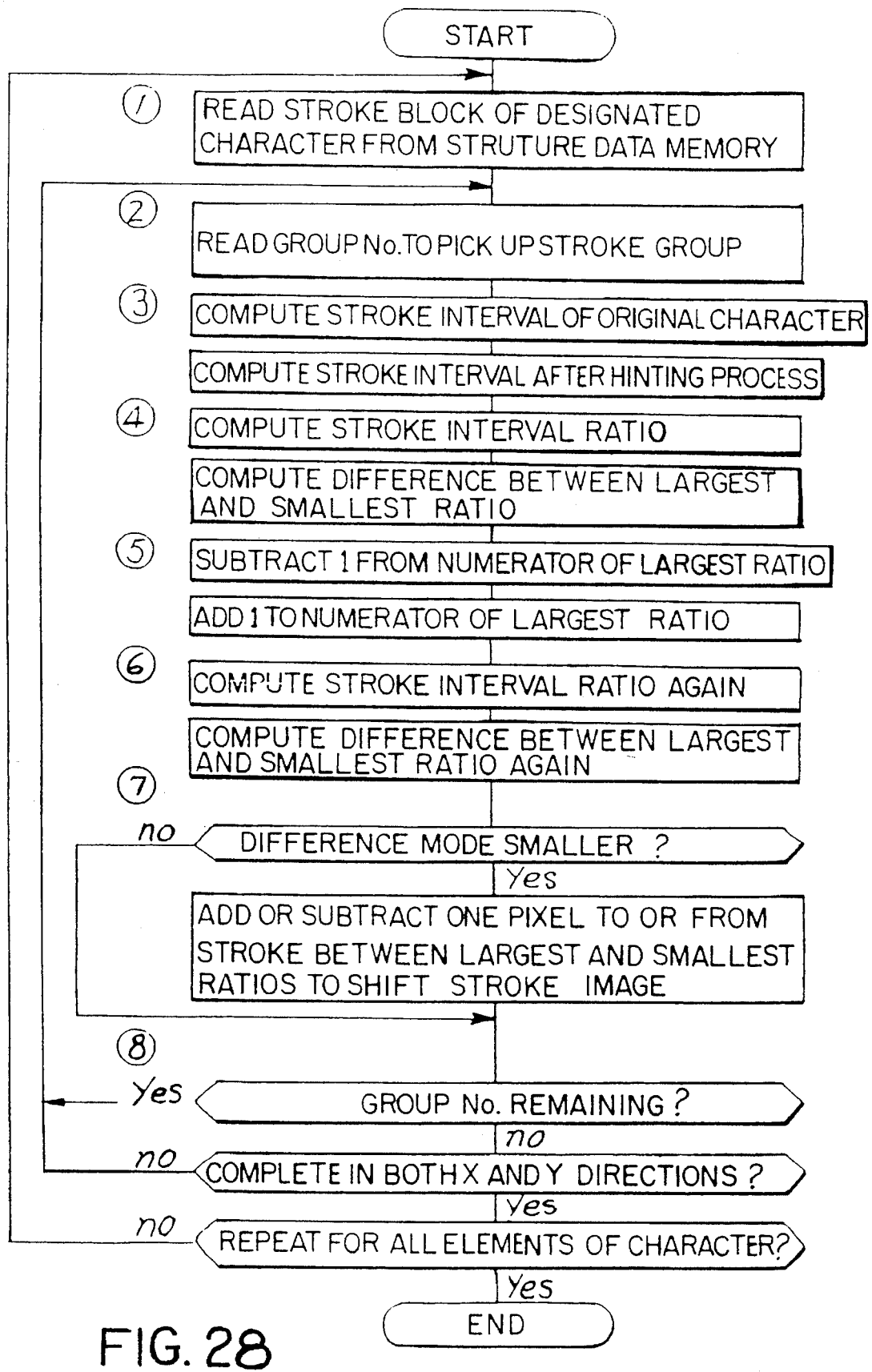
FIG. 28 is a flowchart according to the third embodiment of this invention.
Figure 29:
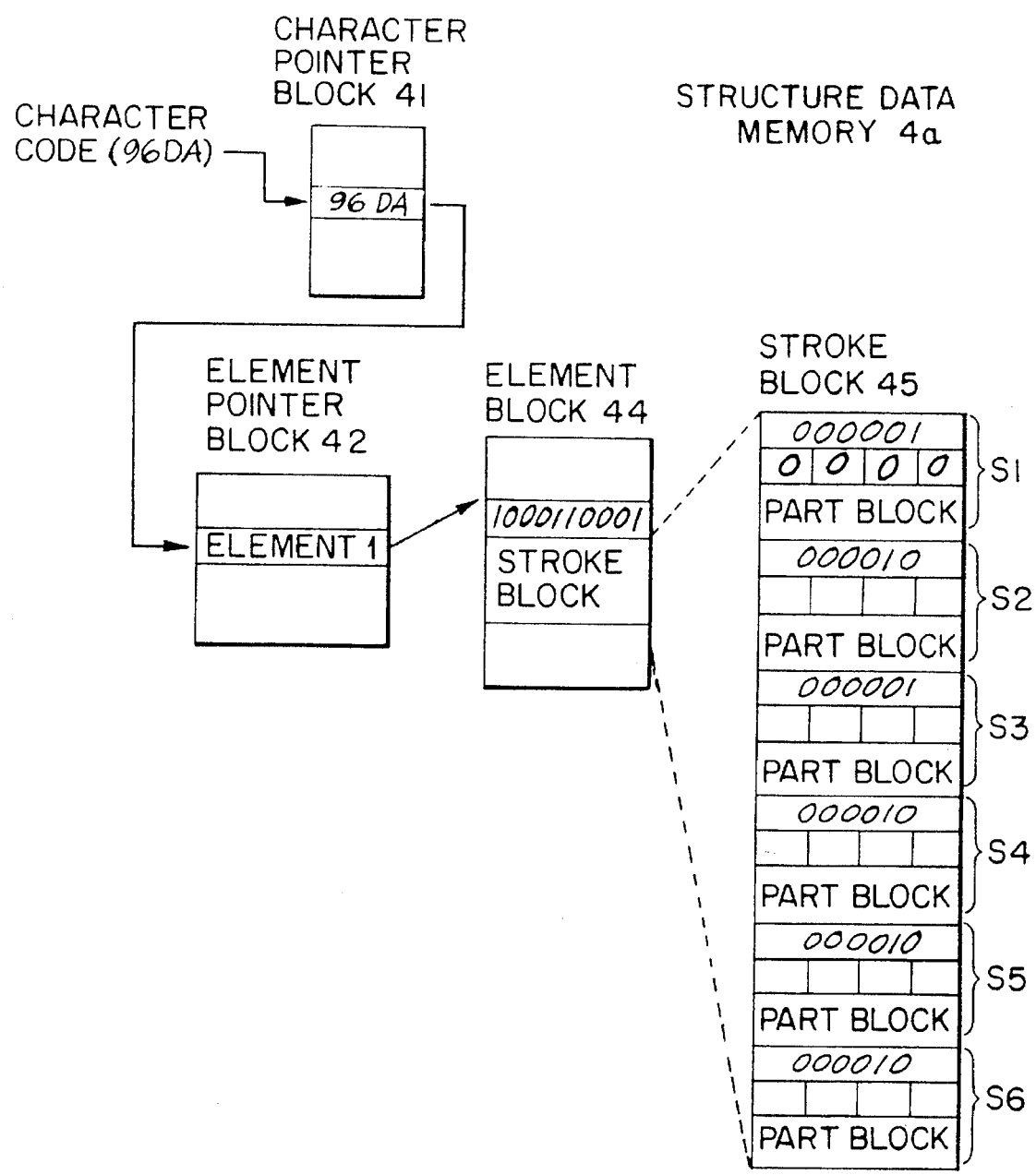
FIG. 29 is an explanatory diagram (part 1) for the character generating operation according to the third embodiment of this invention.
Figure 30:
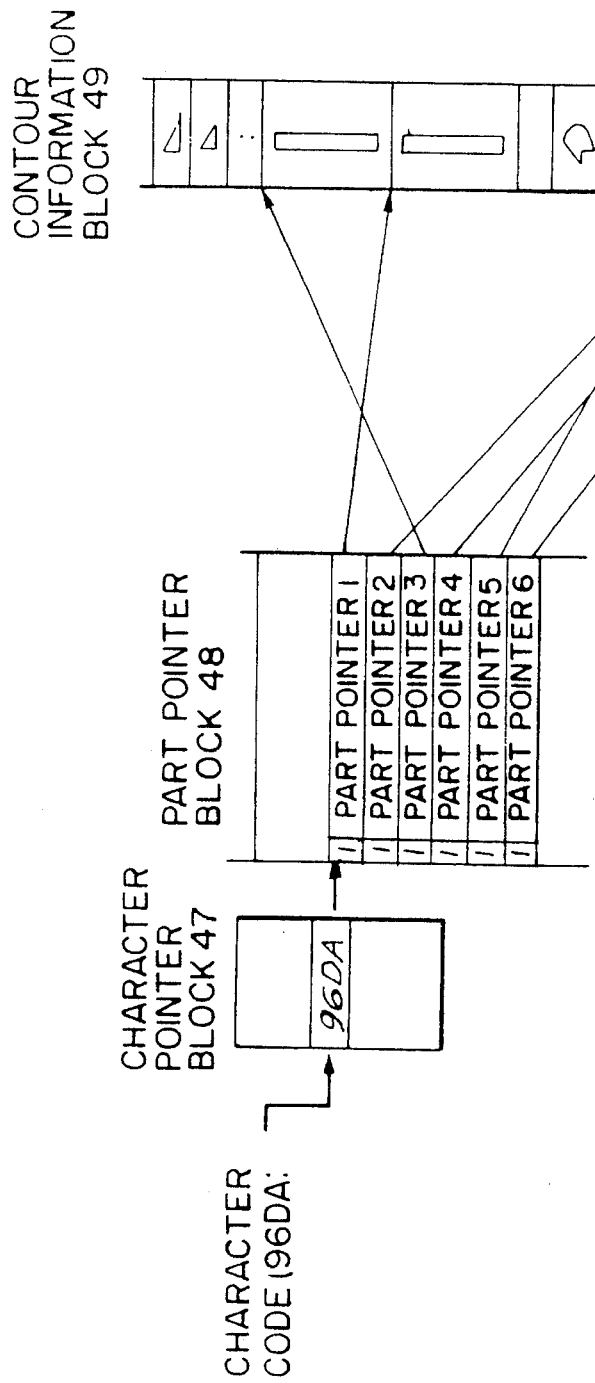
FIG. 30 is an explanatory diagram (part 2) for the character generating operation according to the third embodiment of this invention.
Figure 31:
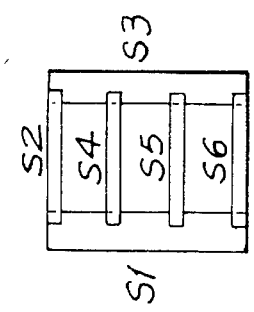
FIG. 31 is a diagram showing the pattern of a Kanji character used in the embodiment shown in FIGS. 29 and 30.
Figure 33B:
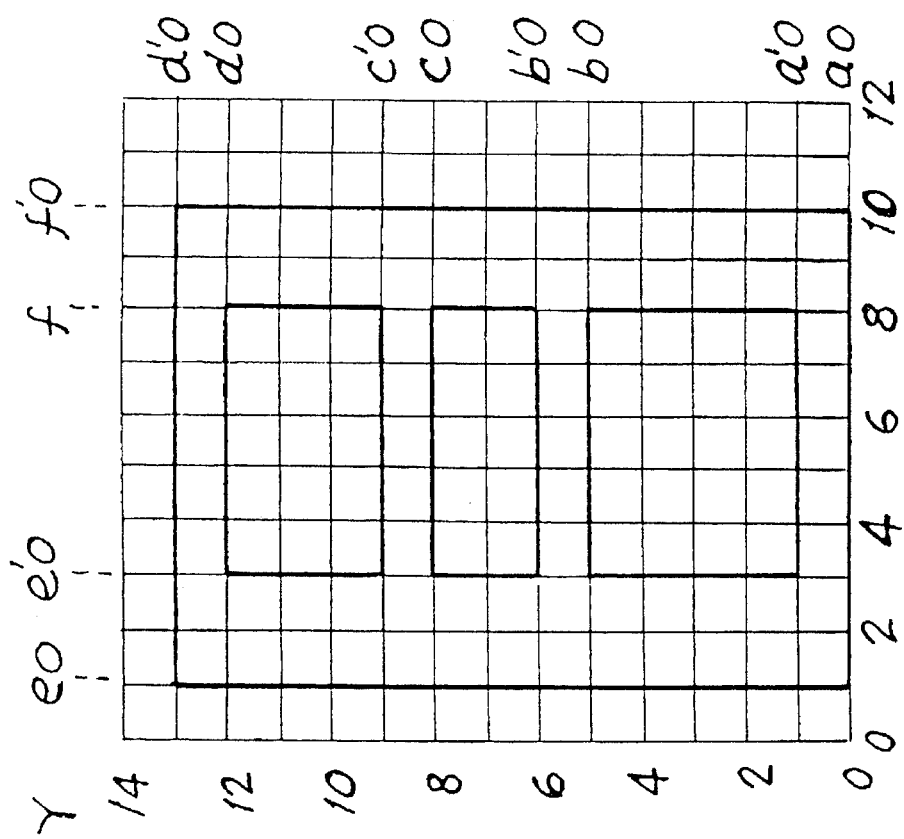
FIG. 33B is a diagram showing coordinates after rounding for explaining the third embodiment.
Figure 33A:
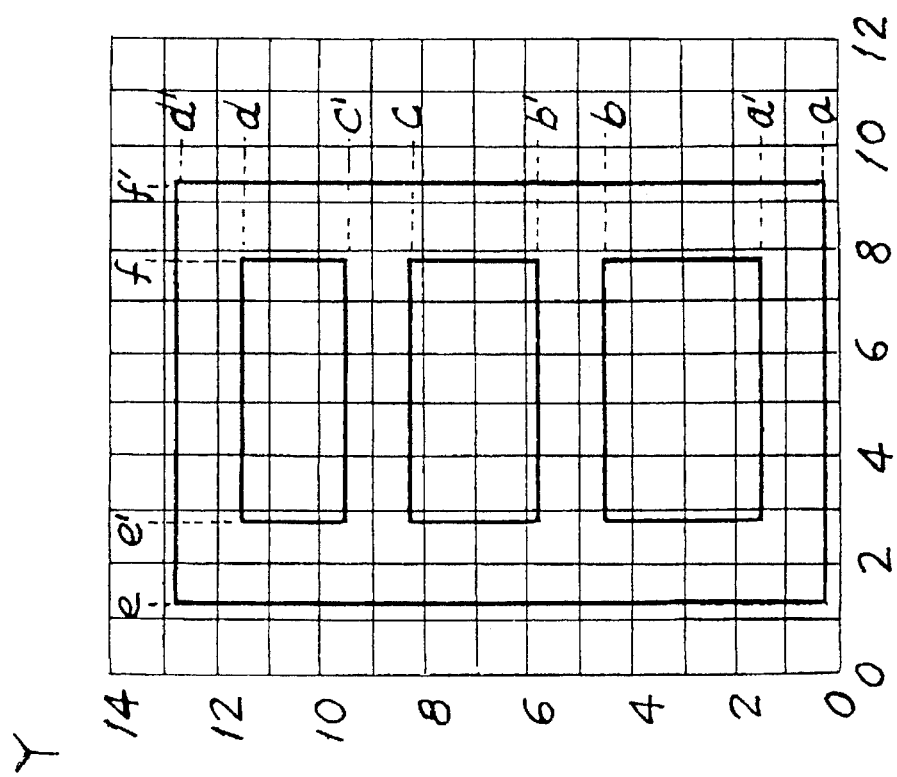
FIG. 33A is a diagram showing coordinates before rounding for explaining the third embodiment.
Figure 34:
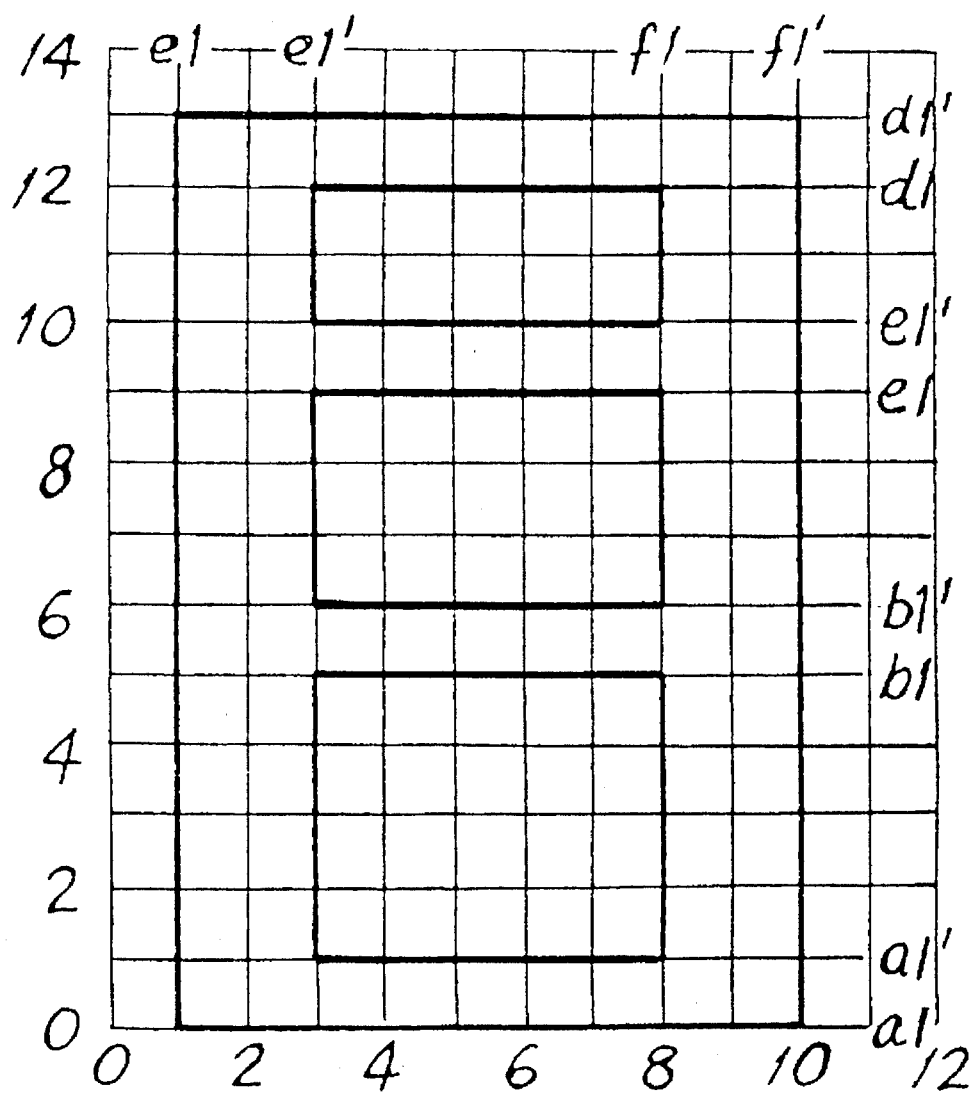
FIG. 34 is an explanatory diagram for explaining the operation of the third embodiment.

FIG. 28 is a flowchart for interval control according to the third embodiment of this invention, FIGS. 29 and 30 are explanatory diagrams (part 1 and part 2) for the character generating operation according to one embodiment of this invention, FIG. 31 shows the pattern of a character used in this embodiment, FIG. 32 is an explanatory diagram for the character developing table in the third embodiment of this invention, and FIGS. 33A, 33B and 34 are operational explanatory diagrams (part 1 and part 2) according to the third embodiment of this invention.

First, a description will be given of the operation of generating a Kanji character "Me" shown in FIG. 31, for example, from the font memory 4 with reference to FIGS. 29, 30 and 32. As shown in FIG. 29, the pointer for an element is obtained in the character pointer block 41 of the structure data memory 4a of the font memory 4 based on the character code "96DA" of the Kanji character "Me." Further, the pointer for the element block 44 where structure data is stored is obtained in the element pointer block 42. Data about the six strokes S1 to S6 constituting the Kanji character "Me" is described in the stroke block 45 next to the classification code of the element in the element block 44. This example shows the data laid out in the stroking order of the character.

As the first stroke S1 is a vertical line, it has a vertical-line classification code "000001," and a control flag portion where the X group number, Y group number, thinner flag and delete flag are arranged in the named order is "0000." As the group numbers for the interval control in both the X and Y directions are set to "0," no interval control is needed, and the thinner flag and delete flag are both "0."

As the second stroke S2 is a horizontal line, it has a horizontal-line classification code "000010." And, this stroke has an Y group number set to "1." This stroke together with the fourth, fifth and sixth strokes S4, S5 and S6, is targeted for interval control in the Y direction. The Kanji character "Me" therefore has four interval control groups in the Y direction.

The fourth and fifth strokes S4 and S5 have their thinner flags set to "1." If the horizontal strokes contact with each other with no interval to spare when the character is developed into a bit map by a Gothic typeface or the like, those lines are made thinner to maintain the interval. Further, the fourth stroke S4 has an delete flag of "1." If the horizontal strokes come very close to each other to be smeared out in black when a small bit map image is to be produced, this stroke is deleted to keep the interval between strokes.

Accordingly, based on the character code of the Kanji character "Me," the contents of the associated stroke block 45 are read out from the structure data memory 4a. Similarly, the pointer for the part pointer block 48 is obtained from the character pointer block 47 based on the character code "96DA" of the Kanji character "Me" as shown in FIG. 30. Then, the associated contour data is obtained from the contour information block 49 in the part pointer block 48.

The enlarging/reducing circuit 30, already explained with reference to FIG. 25, enlarges or reduces the contour data of this part to contour data of the designated character size. For instance, to provide a size of 12 pixels for X and 14 pixels for Y in FIG. 33A, the contour data of a character expressed by the 1000×1000 coordinate system is multiplied by 12/1000 in the X direction and also by 14/1000 in the Y direction. The thus converted contour data is sent together with the data of the stroke block 45 to the hinting processor 31 in FIG. 25. The hinting processor 31 prepares the character developing table shown in FIG. 32.

For each of the strokes constituting a character, this character developing table contains a stroke number, coordinates of the stroke before rounding (X coordinate Xl of the left-hand side of the line width of a vertical stroke, X coordinate Xr of the right-hand side of the line width of the vertical stroke, Y coordinate Yb of the bottom side of the line width of a horizontal stroke, and Y coordinate Yu of the upper side of the line width of the horizontal stroke), coordinates of the stroke after rounding (X coordinate Xl of the left-hand side of the line width of a vertical stroke, X coordinate Xr of the right-hand side of the line width of the vertical stroke, Y coordinate Yb of the bottom side of the line width of a horizontal stroke, and Y coordinate Yu of the upper side of the line width of the horizontal stroke), a group number (X, Y), thinner flag (X, Y), delete flag (X, Y) and the contour data of that stroke.

Therefore, the hinting processor 31 stores the individual pieces of contour data, computed by the enlarging/reducing circuit 30, in the contour data column of the associated strokes in the character developing table. Then, the hinting processor 31 stores the structure data of the strokes in the control flag column (group number (X, Y), thinner flag (X, Y), delete flag (X, Y)). The hinting processor 31 obtains the coordinates of each stroke before rounding in accordance with the contour data and whether or not the stroke is a vertical stroke or horizontal stroke, and stores the coordinate data in the stroke coordinate column before rounding. Further, the hinting processor 31 performs the aforementioned line-width retaining rounding process on the stroke coordinates before rounding. The hinting processor 31 then obtains stroke coordinates after rounding and stores them in the stroke coordinate column after rounding in the character developing table.

The above will be described with reference to case where the Kanji character "Me" shown in FIGS. 29 and 30 is converted to the size shown in FIG. 33A. As shown in FIG. 31, since the first stroke S1 is a vertical stroke, the coordinate of e in FIG. 33A, "1.3," is obtained as the left-hand X coordinate Xl and the coordinate of e' in FIG. 33A, "2.7," is obtained as the right-hand side X coordinate Xr of the line width of that vertical stroke are obtained from the contour data after coordinate conversion. Those coordinates Xl and Xr are stored in the stroke column before rounding in the character developing table.

When the coordinates are subjected to a line-width retaining rounding process, the left-hand side X coordinate Xl of the line width of the first stroke S1 becomes "1" and the right-hand side X coordinate Xr of the line width of that stroke S1 becomes "3" as shown in FIG. 33B. The resultant X coordinates are stored in the stroke column after rounding in the character developing table.

Thereafter, likewise, the stroke coordinates before rounding and the stroke coordinates after rounding are obtained for the second stroke S2, the third stroke S3, the fourth stroke S4, the fifth stroke S5, and the sixth stroke S6, and are stored in the character developing table. In this manner, the Kanji character "Me" before rounding becomes as shown in FIG. 33A, and the Kanji character "Me" after rounding becomes as shown in FIG. 33B.

Using those pieces of data, the interval control process in FIG. 28 is executed by the stroke-interval calculator 32, scaling-factor calculator 36, maximum/minimum scaling-factor detector 38, trial unit 37 and determining circuit 39 shown in FIG. 25.

(1) The hinting processor 31 reads a stroke block of an element of a designated character from the structure data memory 4a of the font memory 4, and stores the contents of that stroke block together with the contour data, obtained by the enlarging/reducing circuit 30, in the character developing table in FIG. 32.

(2) The hinting processor 31 reads the group number column in the character developing table to pick up the stroke groups having the same group number. The hinting processor 31 reads the stroke coordinates before the rounding process and the stroke coordinates after the rounding process and gives them to the stroke-interval calculator 32. With regard to the Kanji character "Me," shown in FIG. 31, for instance, the four strokes S2, S4, S5 and S6 are extracted as strokes of the same group from the character developing table, and their stroke coordinates before the rounding process and their stroke coordinates after the rounding process are read out.

(3) The stroke-interval calculator 32 calculates the stroke interval of the original character from the stroke coordinates before the rounding process, and calculates the stroke interval after the hinting process from the stroke coordinates after the rounding process. In the example shown in FIGS. 32, 33A and 33B, three stroke intervals wa1=d−c', wa2=c−b' and wa3=b−a' in FIG. 33A are computed as the stroke intervals of the original character. Further, three stroke intervals wb1=d0−c'0, wb2=c0−b'0 and wb3=b0−a'0 in FIG. 33B are computed as the stroke intervals after the hinting process.

(4) Then, the scaling-factor calculator 36 divides the stroke intervals after the hinting process by the stroke intervals of the original character to compute a scaling factors (ratios) of the individual stroke intervals. In the example of FIGS. 33A and 33B, wb1/wa1, wb2/wa2 and wb3/wa3 are computed as the scaling factors of the individual stroke intervals. The maximum/minimum scaling-factor detector 38 compares the computed scaling factors with one another to detect the smallest and largest scaling factors. The detector 38 also obtains the difference (first difference) between the largest scaling factor (e.g., wb1/wa1) and the smallest scaling factor (e.g., wb2/wa2).

(5) The trial unit 37 instructs the stroke-interval calculator 32 to subtract "1" from the numerator of the largest scaling factor (stroke interval after the hinting process), and adds "1" to the numerator of the smallest scaling factor (stroke interval after the hinting process).

(6) As a result, the stroke-interval calculator 32 subtracts "1" from the numerator of the largest scaling factor, wa1, and adds "1" to the numerator of the smallest scaling factor, wa2. The scaling-factor calculator 36 computes the scaling factor of the stroke interval for the largest scaling factor and computes the scaling factor of the stroke interval for the smallest scaling factor. That is, the calculator 36 computes (wb1−1)/wa1 and (wb2+1)/wa2. Then, the maximum/minimum scaling-factor detector 38 computes the difference (second difference) between those two scaling factors.

(7) The determining circuit 39 compares the first difference with the second difference to determine if the second difference becomes smaller, indicating that the difference is made smaller by the trial. If the difference has not become smaller, the determining circuit 39 does not change the character developing table of the hinting processor 31. If the difference has become smaller, on the other hand, the determining circuit 39 instructs the hinting processor 31 to add one pixel to or subtract one pixel from the coordinates of the stroke located between the stroke interval of the largest scaling factor and the stroke interval of the smallest scaling factor, thus shifting the stroke image. The hinting processor 31 changes the coordinate values of that stroke after the rounding process in the character developing table by one pixel.

Here, "1" is added to each of the bottom Y coordinate Yb and the upper Y coordinate Yu of the line width of the horizontal stroke S4 between the stroke intervals wb1 and wb2, updating the character developing table. Therefore, the Kanji character "Me" thus generated becomes as shown in FIG. 34.

(8) Next, the hinting processor 31 checks the group number column in the character developing table to check if there still is an unprocessed group number. If there is such an unprocessed group number, the hinting processor 31 returns to step (2). If the hinting processor 31 determines that there is no unprocessed group number, it checks if the interval control has been completed for both the X and Y directions. When the interval control has not been completed, the hinting processor 31 returns to step (2). When the interval control has been completed, on the other hand, the hinting processor 31 determines if the above operation has been repeated for all the elements of the character. When the operation has not been completed for all the elements, the hinting processor 31 returns to step (1). When the operation has been completed for all the elements, the hinting processor 31 terminates the interval control process.

When the interval control is completed, the filling circuit 35 in the character developing circuit 3 performs drawing based on the contents of the character developing table to complete a bit map image.

This will be specifically explained with the Kanji character "Me" shown in FIGS. 32, 33A, 33B and 34 taken as an example. In step (2), the strokes S2, S4, S5 and S6 are extracted as the same horizontal stroke group from the character developing table shown in FIG. 32, and the stroke coordinates before rounding and stroke coordinates after rounding are read out. Then, in step (3) the intervals wa1, wa2 and wa3 between strokes before the rounding process are calculated as follows.

$$wa1 = d(Yb \text{ of stroke } S2) - c'(Yu \text{ of stroke } S4)$$
$$= 11.5 - 9.5 = 2.0$$
$$wa2 = c(Yb \text{ of stroke } S4) - b'(Yu \text{ of stroke } S5)$$
$$= 8.3 - 5.7 = 2.6$$
$$wa3 = b(Yb \text{ of stroke } S5) - a'(Yu \text{ of stroke } S6)$$
$$= 4.5 - 1.5 = 3.0$$

The intervals wb1, wb2 and wb3 between strokes after the rounding process are calculated as follows.

$$wb1 = d0(Yb \text{ of stroke } S2) - c'0(Yu \text{ of stroke } S4)$$
$$= 12 - 9 = 3$$
$$wb2 = c0(Yb \text{ of stroke } S4) - b'0(Yu \text{ of stroke } S5)$$
$$= 8 - 6 = 2$$
$$wb3 = b0(Yb \text{ of stroke } S5) - a'0(Yu \text{ of stroke } S6)$$
$$= 5 - 1 = 4$$

Then, the scaling factors wb1/wa1, wb2/wa2 and wb3/wa3 of the stroke intervals are calculated as follows in step (4).

$$wb1/wa1 = 3/2.0 = 1.5$$

$$wb2/wa2 = 2/2.6 = 0.77$$

$$wb3/wa3 = 4/3.0 = 1.33$$

The difference r1 between the largest and smallest scaling factors is computed as follows.

$$r1 = wb1/wa1 - wb2/wa2 = 1.5 - 0.77 = 0.73$$

Next, the interval wb2 after the rounding process of the stroke interval of the smallest scaling factor is increased by "1" and the interval wb1 after the rounding process of the stroke interval of the largest scaling factor is decreased by "1." Then, the scaling factors wb1/wa1, wb2/wa2 and wb3/wa3 of the stroke intervals are calculated again in step (6).

$$wb1/wa1 = 2/2.0 = 1.0$$

$$wb2/wa2 = 3/2.6 = 1.15$$

$$wb3/wa3 = 4/3.0 = 1.33$$

The difference r2 between the largest and smallest scaling factors is computed as follows.

$$r2 = wb3/wa3 - wb1/wa1 = 1.33 - 1.0 = 0.33$$

When the difference r1 before the switching trial and the difference r2 after the trial in step (7), the difference r2 after the trial is smaller. It is apparent that the trial has made the difference between the magnification factors (scaling factors) of the stroke intervals smaller.

All the strokes, sandwiched between the stroke interval of the smallest scaling factor and the stroke interval of the largest scaling factor, are shifted by one pixel toward the stroke interval of the largest scaling factor. Since the stroke interval of the smallest scaling factor is c0–b'0 and the stroke interval of the largest scaling factor is d0–c'0 in this example, only the second horizontal stroke S4 from the top is what is sandwiched between the mentioned two stroke intervals. The coordinates of this stroke S4 are therefore shifted toward the stroke interval of the largest scaling factor.

That is, the coordinates of the horizontal stroke S4 after the rounding process in the character developing table are shifted up by one pixel. "1" is added to the bottom Y coordinate Yb of the line width of this horizontal stroke S4, changing it to "9" from "8," and "1" is added to the upper Y coordinate Yu of the line width of this horizontal stroke S4, changing it to "9" from "10."

Through the above operation, the bit map image close to the original design of the Kanji character "Me" can be obtained, as shown in FIG. 34.

To make the difference between the largest scaling factor and the smallest scaling factor smaller, as described above, the difference between those scaling factors when a stroke is shifted by one pixel is obtained, the first difference before the shifting is compared with the second difference after the shifting to determine the stroke position which minimizes the difference. The shifting can be accomplished by easy operations. Since the stroke intervals before rounding are calculated from the stroke coordinates before the rounding process, the stroke intervals before the rounding process will be calculated easily. Further, since data designating that stroke of a character whose stroke intervals are to be controlled is set together with the outline data of the character, the stroke intervals to be controlled will easily be recognized, ensuring stroke adjustment that matches with the original character design. Furthermore, as the stroke intervals before rounding are computed from the stroke data obtained through conversion from the character outline data, the stroke intervals before rounding will be obtained easily, thus accomplishing the character generation without lowering the generation speed so much.

Although the description of this embodiment has been given with reference to the Kanji character "Me," this embodiment may be applied to other Kanji characters having parallel horizontal strokes or Kanji characters having parallel vertical strokes. Although the stroke intervals before rounding are computed from the coordinate values after coordinate conversion, they may be calculated from the original contour data in the font memory 4, and the stroke intervals may be stored in the font memory. The origin of a part expressed in the character coordinate system may be set, so that contour data may be expressed by the relative positions from this origin. Although the font memory has been explained as a part-segmenting type, it may be a stroke-segmenting type.

In short, according to this invention, any contact between strokes is detected, and the target stroke after rounding is made thinner or that stroke is deleted. Even when the character is reduced, it is possible to prevent the intervals between the adjacent strokes from being smeared out and to provide a bit map image that reproduces the original character design. The sum of the stroke intervals after rounding is obtained and is compared with the total number of strokes minus "1." When the sum is smaller than the resultant value of the subtraction, it is determined that the target strokes are in contact with each other, and some stroke is made thinner or deleted, thus accomplishing the character generation without lowering the generation speed so much.

Further, as the stroke intervals after rounding are adjusted to be equal to the stroke intervals of the original character, it is possible to provide a bit map image that reproduces the original character design. The stroke intervals are adjusted in such a way that the scaling factors of the individual intervals are calculated from the stroke intervals before rounding and the stroke intervals after rounding and the coordinates of the strokes located between a plurality of stroke intervals are so shifted as to reduce the difference between the largest and smallest scaling factors among the computed scaling factors. This can accomplish the character generation without lowering the generation speed so much.

What is claimed is:

1. A character generating method for generating characters from outline font data in which contour lines of a character are expressed by coordinates of a coordinate system to produce a bit map image of said characters, the method comprising the steps of:

providing a computer with a font memory and a character developing unit;

converting said outline font data to coordinate values of a coordinate system of a designated size;

rounding said converted coordinate values to integer coordinate values;

computing a sum of intervals between a plurality of strokes extending in the same direction of coordinates of the coordinate system after the rounding step;

comparing said sum with a number of target strokes minus 1;

changing said integer coordinate values so as to adjust a line width of a desired stroke of said target strokes when said sum is smaller than a value resulting from a subtraction; and developing said integer coordinate values including said adjusted coordinate values to produce said bit map image, wherein each said converting, rounding, computing, comparing, changing and developing step is carried out by said character developing unit of said computer.

2. The character generating method according to claim 1, wherein said integer-coordinate value changing step changes said integer coordinate values in such a way as to make said desired stroke thinner.

3. The character generating method according to claim 2, wherein said integer-coordinate value changing step changes said integer coordinate values in such a way as to make thinner those of said plurality of strokes which are other than outermost strokes and which have a line width of two pixels or greater.

4. The character generating method according to claim 2, wherein said sum-computing step computes said sum of intervals between strokes from said rounded integer coordinate values of a plurality of designated strokes.

5. The character generating method according to claim 4, wherein said integer-coordinate value changing step changes a line width of a specified one of said plurality of designated strokes when said sum is smaller than said value resulting from the subtraction.

6. The character generating method according to claim 1, wherein said integer-coordinate value changing step changes said integer coordinate values in such a way as to make said desired stroke thinner.

7. The character generating method according to claim 6, wherein said sum-computing step computes said sum of intervals between strokes from said rounded integer coordinate values of a plurality of designated strokes.

8. The character generating method according to claim 7, wherein said integer-coordinate value changing step changes a line width of a specified one of said plurality of designated strokes when said sum is smaller than said value resulting from the subtraction.

9. The character generating method according to claim 1, wherein said sum-computing step computes said sum of intervals between strokes from said rounded integer coordinate values of a plurality of designated strokes.

10. The character generating method according to claim 9, wherein said integer-coordinate value changing step changes a line width of a specified one of said designated plurality of strokes when said sum is smaller than said value resulting from the subtraction.

11. The character generating method according to claim 1, wherein said bit-map image producing step develops outline font data of a plurality of parts constituting each stroke to produce said bit map image of said character.

12. A character generating method for generating characters from outline font data in which contour lines of a character are expressed by coordinates of a coordinate system to produce a bit map image of said characters, the method comprising the steps of:

providing a computer having a font memory and a character developing unit;

converting said outline font data to coordinate values of a coordinate system of a designated size;

rounding said converted coordinate values to integer coordinate values;

computing scaling factors of individual stroke intervals from intervals between individual strokes before the rounding step and intervals between individual strokes after said rounding step;

computing a difference between a largest scaling factor and a smallest scaling factor among said scaling factors;

shifting said integer coordinate values of a desired stroke among said strokes so as to make said difference smaller; and developing said integer coordinate values including said shifted coordinate values to produce said bit map image, wherein each said converting, rounding, scaling factors computing, difference computing, shifting and developing step is carried out by said character developing unit of said computer.

13. The character generating method according to claim 12, wherein said computing and said integer-coordinate values shifting steps include the steps of:

computing a first scaling factor, obtained by subtracting 1 from a stroke interval after said rounding step which provides said largest scaling factor, and a second scaling factor, obtained by adding 1 to a stroke interval after said rounding step which provides said smallest scaling factor;

computing a difference between said first scaling factor and said second scaling factor;

comparing said difference obtained in said computing step of computing a difference between a largest scaling factor and a smallest scaling factor with said difference between said first and second scaling factors; and shifting a stroke located between said stroke interval of said largest scaling factor and said stroke interval of said smallest scaling factor by one coordinate unit toward said stroke interval of said largest scaling factor, when said difference between said first and second scaling factors is smaller than said difference obtained in said computing step of computing a difference between a largest scaling factor and a smallest scaling factor.

14. The character generating method according to claim 12, wherein said integer-coordinate value shifting step shifts said integer coordinate values of a desired stroke among said plurality of designated strokes so as to make said difference smaller.

15. The character generating method according to claim 12, wherein said bit-map image producing step develops outline font data of a plurality of parts constituting each stroke to produce said bit map image of said character.

16. A character generating apparatus for generating characters from outline font data in which contour lines of a character are expressed by coordinates of a coordinate system to develop a character into a bit map data, the apparatus comprising:

a font memory for storing outline font data of a plurality of characters; and a character developing circuit for converting outline font data of a designated character, read from said font memory, to coordinate values of a coordinate system of a designated size, rounding said coordinate values to integer coordinate values, detecting if there is any contact between strokes of said character from said coordinate values after rounding of said coordinate values, and changing said integer coordinate values if there is such contact to produce said bit map image, wherein after computing a sum of intervals between a plurality of strokes extending in the same direction of coordinates in the coordinate system after said rounding, said character developing circuit compares said sum with a number of target strokes minus 1, changes said integer coordinate values so as to adjust a line width of a desired stroke of said target strokes when said sum is smaller than a value resulting from a subtraction, and develops said integer coordinate values including said adjusted coordinate values to produce said bit map image.

17. The character generating apparatus according to claim 16, wherein said character developing circuit changes said integer coordinate values in such a way as to make said desired stroke thinner.

18. The character generating apparatus according to claim 17, wherein to change said integer coordinate values, said character developing circuit changes said integer coordinate values in such a way as to make thinner those of said plurality of strokes which are other than outermost strokes and which have a line width of two pixels or greater.

19. The character generating apparatus according to claim 17, wherein said font memory stores data specifying said target strokes as stroke data corresponding to said character; and said character developing circuit computes said sum of intervals between strokes from said rounded integer coordinate values of a plurality of designated strokes.

20. The character generating apparatus according to claim 19, wherein said font memory stores data specifying said stroke to be adjusted as stroke data corresponding to said character; and to change said integer coordinate values, said character developing circuit changes a line width of a specified one of said plurality of designated strokes when said sum is smaller than said value resulting from a subtraction.

21. The character generating apparatus according to claim 16, wherein said character developing circuit changes said integer coordinate values in such a way as to delete said desired stroke.

22. The character generating apparatus according to claim 21, wherein said font memory stores data specifying said target strokes as stroke data corresponding to said character; and said character developing circuit computes said sum of intervals between strokes from said rounded integer coordinate values of a plurality of designated strokes.

23. The character generating apparatus according to claim 22, wherein said font memory stores data specifying said stroke to be adjusted as stroke data corresponding to said character; and to change said integer coordinate values, said character developing circuit changes a line width of a specified one of said designated plurality of strokes when said sum is smaller than said value resulting from a subtraction.

24. The character generating apparatus according to claim 16, wherein said font memory stores data specifying said target strokes as stroke data corresponding to said character; and said character developing circuit computes said sum of intervals between strokes from said rounded integer coordinate values of a plurality of designated strokes.

25. The character generating apparatus according to claim 24, wherein said font memory stores data specifying said stroke to be adjusted as stroke data corresponding to said character; and to change said integer coordinate values, said character developing circuit changes a line width of a specified one of said plurality of designated strokes when said sum is smaller than said value resulting from the subtraction.

26. The character generating apparatus according to claim 16, wherein said font memory stores outline font data of parts of each character of said plurality of characters and part-designating data of each character; and said character developing circuit extracts that outline font data specified by said part-specifying data of a designated character, and develops outline font data of a plurality of parts constituting each stroke to produce said bit map image of said character.

27. A character generating apparatus for generating characters from outline font data in which contour lines of a character are expressed by coordinates of a coordinate system to develop a character into a bit map data, the apparatus comprising:

a font memory for storing outline font data of a plurality of characters; and a character developing circuit for converting outline font data of a designated character, read from said font memory, to coordinate values of a coordinate system of a designated size, rounding said coordinate values to integer coordinate values, and changing said integer coordinate values in such a way as to make a difference between largest and smaller scaling factors of stroke intervals before and after rounding of said coordinate values to integer coordinate values to thereby produce said bit map image, wherein after computing scaling factors individual intervals from intervals between individual strokes before the rounding of said coordinate values and intervals between individual strokes after said rounding, said character developing circuit computes a difference between a largest scaling factor and a smallest scaling factor among said scaling factors, shifts said integer coordinate values of a desired stroke among said strokes so as to make said difference smaller, and develops said integer coordinate values including said shifted coordinate values to produce said bit map image.

28. The character generating apparatus according to claim 27, wherein after computing a first scaling factor, obtained by subtracting 1 from a stroke interval after said rounding of said coordinate values which provides said largest scaling factor, and a second scaling factor, obtained by adding 1 to a stroke interval after said rounding which provides said smallest scaling factor, said character developing circuit computes a difference between said first scaling factor and said second scaling factor, compares said difference between said largest scaling factor and said smallest scaling factor with said difference between said first and second scaling factors, and shifts a stroke located between said stroke interval of said largest scaling factor and said stroke interval of said smallest scaling factor by one coordinate unit toward said stroke interval of said largest scaling factor, when said difference between said first and second scaling factors is smaller than said difference between said largest scaling factor and said smallest scaling factor.

29. The character generating apparatus according to claim 27, wherein said font memory stores data specifying said target strokes as stroke data corresponding to said character; and said character developing circuit computes intervals of said plurality of designated strokes.

30. The character generating apparatus according to claim 29, wherein said font memory stores data specifying said stroke to be shifted as stroke data corresponding to said character; and said character developing circuit shifts a specified one of said plurality of designated strokes.

31. The character generating apparatus according to claim 27, wherein said font memory stores outline font data of parts of each character of said plurality of characters and part-designating data of each character; and said character developing circuit extracts that outline font data specified by said part-specifying data of a designated character, and develops outline font data of a plurality of parts constituting each stroke to produce said bit map image of said character.

* * * * *